(12) United States Patent  
Tatewaki et al.

(10) Patent No.: US 8,450,239 B2  
(45) Date of Patent: May 28, 2013

(54) REVERSIBLE THERMOSENSITIVE RECORDING MEDIUM

(75) Inventors: Tadafumi Tatewaki, Shizuoka (JP); Hiroyuki Ina, Shizuoka (JP); Nobuyoshi Sugiyama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 783 days.

(21) Appl. No.: 12/342,779

(22) Filed: Dec. 23, 2008

(65) Prior Publication Data

US 2009/0170699 A1 Jul. 2, 2009

(30) Foreign Application Priority Data

Dec. 28, 2007 (JP) ................. 2007-340016

(51) Int. Cl.  
 *B41M 5/26* (2006.01)

(52) U.S. Cl.  
 USPC ............. 503/201; 235/488; 283/83; 428/137

(58) Field of Classification Search  
 None  
 See application file for complete search history.

(56) References Cited

U.S. PATENT DOCUMENTS

| | | | |
|---|---|---|---|
| 4,463,971 A | 8/1984 | Hoppe et al. | |
| 2005/0170961 A1 | 8/2005 | Kuboyama et al. | |
| 2006/0094599 A1 | 5/2006 | Kuboyama et al. | |
| 2007/0236718 A1 | 10/2007 | Yokomura et al. | |
| 2007/0266521 A1 | 11/2007 | Pang Kim Pong et al. | |
| 2007/0268319 A1 | 11/2007 | Tatewaki et al. | |

FOREIGN PATENT DOCUMENTS

| CN | 1649743 A | 8/2005 |
|---|---|---|
| EP | 1502764 A1 | 2/2005 |
| GB | 2096541 A | 10/1982 |
| JP | 9-290563 | 11/1997 |
| JP | 11-59037 | 3/1999 |
| JP | 11-85938 | 3/1999 |
| JP | 11-91274 | 4/1999 |
| JP | 11-154210 | 6/1999 |
| JP | 2000-94866 | 4/2000 |
| JP | 2000-251042 | 9/2000 |
| JP | 2001-63228 | 3/2001 |
| JP | 2002-103654 | 4/2002 |
| JP | 2002-117880 | 4/2002 |
| JP | 2003-141486 | 5/2003 |
| JP | 2003-141494 | 5/2003 |
| JP | 2004-14621 | 1/2004 |
| JP | 2004-171312 | 6/2004 |
| JP | 2004-209899 | 7/2004 |
| JP | 2005-250578 | 9/2005 |
| JP | 2005-276238 | 10/2005 |
| JP | 2006-309603 | 11/2006 |
| JP | 2006-344207 | 12/2006 |
| JP | 2008-162077 | 7/2008 |
| JP | 2008-229911 | 10/2008 |
| WO | WO97/03466 | 1/1997 |

OTHER PUBLICATIONS

Nov. 24, 2010 Chinese official action (with English translation) in connection with a counterpart Chinese patent application.

European search report in connection with a counterpart European patent application No. 08 17 2956.

*Primary Examiner* — Bruce H Hess

(74) *Attorney, Agent, or Firm* — Cooper & Dunham LLP

(57) ABSTRACT

A reversible thermosensitive recording medium including an electronic information recording sheet having at least an electronic information recording element projecting from a surface thereof, a first sheet having a through hole into which the electronic information recording element can be inserted, and a second sheet having a cut-out portion capable of housing the entire electronic information recording sheet, wherein the second sheet houses in the cut-out portion the entire electronic information recording sheet, with being laid over the first sheet, and the electronic information recording element is inserted into the through hole.

8 Claims, 7 Drawing Sheets

REVERSIBLE THERMOSENSITIVE RECORDING MEDIUM

BACKGROUND OF THE INVENTION

1. Field of the Invention

The present invention relates to an electronic information recording element-embedded reversible thermosensitive recording medium in which, even when image erasure/formation is performed at high speed, white voids and color fading do not occur in the formed image areas each corresponding to the surrounding area of an electronic information recording sheet, to an electronic information recording element, to an antenna circuit and to a conductive member; and image erasure can be completely performed.

2. Description of the Related Art

IC cards have been increasingly being used in various aspects from users' daily lives to business activities. Actually, they are used as various cards (e.g., cash cards, credit cards, prepaid cards and ETC cards (electronic toll collection system)); in transportation facilities (e.g., railways and buses); as affiliate cards for digital broadcasting, 3rd generation mobile phones, etc.; in library service counters; and as student ID cards, employee ID cards, basic resident register cards, etc. Meanwhile, the amount of IC cards disposed of has been being increasing in accordance with diversification of the current economic and social activities.

In view of this, there is a keen need to create a recycling society, where material consumption is reduced and less environmental load is given, by reconsidering the current economic societies and lifestyles involving mass production, mass consumption and mass disposal to promote effective utilization and recycling of materials.

As one promising measure, electronic information recording element (hereinafter may be referred to as an "IC chip module" or "IC chip")-embedded reversible thermosensitive recording media can be used for reducing the amount of products disposed of. This is because they can rewrite information stored in the IC chip and show information as a visible image on their surface.

Such IC chip module-embedded reversible thermosensitive recording media have been used in the manufacturing industry as instruction sheets such as operation sheets, parts management sheets and process management sheets. Actually, there is repeatedly performed a cycle including winding an instruction sheet around a rod-like part or inserting it into a card case, washing stains on the instruction sheet, and rewriting the content of the instruction sheet using a printer.

When an image is formed on or erased from it, a heating tool (e.g., thermal head, erase bar, erase roller and erase plate) of the printer is pressed against the instruction sheet. Thus, rewriting of the instruction sheet must be performed so as not to break the IC chip module and not to avoid outflow of an adhesive agent from an adhesive portion between the IC chip module and the reversible thermosensitive recording medium. Also, washing of the instruction sheet must be performed so that the IC chip module is not peeled off from the reversible thermosensitive recording medium. Furthermore, desirably, the instruction sheet is flexible and shows a high-quality image.

For example, Japanese Patent Application Laid-Open (JP-A) Nos. 11-154210, 2000-94866, 2000-251042, 2001-63228 and 2002-103654 disclose IC cards as shown in FIG. 1 including, as an over sheet, a reversible thermosensitive recording sheet 114 having at least one reversible thermosensitive layer 114b containing an intrinsically colorless or light-colored leuco dye and a reversible color developer allowing the leuco dye to develop color through application of heat and to erase the developed color through next application of heat, and including, as the other over sheet, a base film 111 in which an IC card having an IC chip module 112 is embedded, wherein a core member 113 is formed between these two over sheets through injection molding so that these are thermally bonded via the core member 113 to each other.

In the above-described IC cards, the IC chip module 112 is provided so as to face the reversible thermosensitive recording sheet 114 and thus, the reversible thermosensitive recording medium is ununiformly pressed due to the IC chip module 112, whereby concavo-convex portions are undesirably formed on the recording medium. The reversible thermosensitive recording medium having the concavo-convex portions cannot be uniformly heated using a heating tool and thus, heat cannot be uniformly conducted in the reversible thermosensitive recording medium when image formation is performed. As a result, an uneven image is formed on the reversible thermosensitive recording medium. Also, when image erasure is performed, a heating tool is ununiformly pressed against the reversible thermosensitive recording medium, leading to failure in image erasure. Furthermore, the reversible thermosensitive recording medium has, on the surface thereof, a convex portion corresponding to the IC chip module 112. As a result, a heating tool is pressed via the reversible thermosensitive recording medium against the IC chip module 112, causing a problem in that the IC chip module 112 is damaged or peeled off from the reversible thermosensitive recording medium.

In view of this, for example, JP-A Nos. 11-91274, 11-59037, 11-85938, 2002-117880, 2003-141486 and 2003-141494 discloses countermeasures against the above problems. IC chip module-embedded reversible thermosensitive recording media disclosed in these Patent Literatures, however, have low flexibility and high rigidity (i.e., large thickness and high hardness).

JP-A Nos. 2005-250578 and 2006-344207, therefore, disclose reversible thermosensitive recording media in which an IC chip module is provided on an IC chip substrate disposed over a reversible thermosensitive recording sheet so that the IC chip module does not face the recording sheet. However, on the surface of an electronic information recording sheet having an electronic information recording element, an antenna circuit and a conductive member (hereinafter the electronic information recording sheet may be referred to as an "inlet"), concavo-convex portions are formed not only by the electronic information recording element but also by the antenna circuit and the conductive member. In this antenna circuit, a conductive member connects a front face of the antenna circuit board, in which surface an antenna circuit is formed, to a back face thereof to form a jumping circuit. When these front and back faces are penetrated using a laser, etc. for conduction, so-called caulking portions are formed. These caulking portions and the conductive member formed on the back face form concavo-convex portions on the electronic information recording sheet. Thus, as described above, even if only the IC chip is provided on the IC chip substrate over the reversible thermosensitive recording sheet so that the IC chip does not face the recording sheet, concavo-convex portions are formed on the reversible thermosensitive recording sheet. In particular, JP-A No. 2006-344207 describes that an antenna circuit board 2 has, on its back face, an electrically short-circuited jumper wire 12. However, also when the jumper wire 12 is formed on the reversible thermosensitive recording sheet side, the reversible thermosensitive recording medium problematically involves failures in image formation/erasure.

In order to solve the above-described problems, the present inventor has previously filed JP-A Nos. 2008-162077 and 2008-229911. In these Patent Literatures, an electronic information recording element is housed in a through hole of a sheet so as not to project from the sheet; and a face of the reversible thermosensitive recording sheet, on which face no reversible thermosensitive recording layer is provided, is made to face a face of the electronic information recording sheet, on which face none of an antenna circuit board, an electronic information recording element, antenna circuit and a conductive member is provided. In the reversible thermosensitive recording media having such a configuration, failure in image formation/erasure can be overcome when the transfer speed of a printer used is 2 IPS. However, when the reversible thermosensitive recording media undergo image erasure/formation at high speed (3 IPS or higher), a rewritten image cannot be improved in its qualities (i.e., involves color fading and incomplete erasure) in an area corresponding to the electronic information recording sheet (including areas each corresponding to an IC chip, an antenna circuit and a conductive member), leading to failure in color development.

Hitherto, the present inventor carried out studies on improvement in qualities of a rewritten image area corresponding to an electronic information recording sheet when the transfer speed of a printer used is 2 IPS, and has found that when image erasure/formation is performed at a transfer speed of 3 IPS, a rewritten image cannot be improved in its qualities. This is because the higher the transfer speed of the printer, the more difficult it is that heat applied from the erasure head is conducted in the reversible thermosensitive recording medium. When a temperature for image erasure is increased for improving erasability, the reversible thermosensitive recording medium is excessively heated by the erasure head. In this state, when image formation is performed, the reversible thermosensitive recording medium cannot be rapidly cooled to prevent color development (to be in an erasure mode).

When the electronic information recording sheet has, on a surface thereof, height differences and concavo-convex portions (i.e., the electronic information recording sheet does not have a flat surface and has concavo-convex portions in which the height from the top surface to the base portion is about 50 µm and which are formed by the IC chip, the antenna circuit, and the caulking portion connecting the antenna circuit to the IC chip), a thermal head insufficiently comes into contact with a surface of the reversible thermosensitive recording medium and thus, heat is not sufficiently conducted in the surface thereof due to the heat insulating effect of air. As a result, the reversible thermosensitive recording medium cannot be rapidly cooled, causing failure in color development.

Under such circumstances, demand has arisen for a high-quality electronic information recording element-embedded reversible thermosensitive recording medium in which, even when image erasure/formation is performed at a high speed of 3 IPS or higher, white voids and color fading do not occur in the formed image areas each corresponding to the surrounding area of the electronic information recording sheet, to the electronic information recording element, to the antenna circuit and to the conductive member; image erasure can be completely performed; and no lamination displacement occurs.

BRIEF SUMMARY OF THE INVENTION

An object of the present invention is to provide a high-quality electronic information recording element-embedded reversible thermosensitive recording medium in which, even when image erasure/formation is performed at a high speed of 3 IPS or higher, white voids and color fading do not occur in the formed image areas each corresponding to the surrounding area of the electronic information recording sheet, to the electronic information recording element, to the antenna circuit and to the conductive member; image erasure can be completely performed; and no lamination displacement occurs.

Means for solving the above problems pertinent in the art are as follows:

<1> A reversible thermosensitive recording medium including:

an electronic information recording sheet having at least an electronic information recording element projecting from a surface thereof, a first sheet having a through hole into which the electronic information recording element can be inserted, and a second sheet having a cut-out portion capable of housing the entire electronic information recording sheet, wherein the second sheet houses in the cut-out portion the entire electronic information recording sheet, with being laid over the first sheet, and the electronic information recording element is inserted into the through hole.

<2> The reversible thermosensitive recording medium according to <1> above, further including a base sheet and a reversible thermosensitive recording sheet, wherein the first sheet, the second sheet housing the entire electronic information recording sheet, and the reversible thermosensitive recording sheet are laid over the base sheet in this order; and the electronic information recording element projects toward the base sheet and is inserted into the through hole.

<3> The reversible thermosensitive recording medium according to <2> above, further including a third sheet disposed between the second sheet and the reversible thermosensitive recording sheet.

<4> The reversible thermosensitive recording medium according to <1> above, further including a reversible thermosensitive recording sheet and a base sheet, wherein the first sheet, the second sheet housing the entire electronic information recording sheet, and the base sheet are laid over the reversible thermosensitive recording sheet in this order; and the electronic information recording element projects toward the reversible thermosensitive recording sheet and is inserted into the through hole.

<5> The reversible thermosensitive recording medium according to <4> above, further including a third sheet disposed between the second sheet and the base sheet.

<6> The reversible thermosensitive recording medium according to any one of <1> to <5> above, wherein a gap between a periphery of the electronic information recording sheet and a periphery of the cut-out portion is 0.0 mm to 0.1 mm.

<7> The reversible thermosensitive recording medium according to any one of <1> to <6> above, wherein a thickness of the second sheet falls within a range of ±10 µm of a maximum thickness of the electronic information recording sheet, excluding a thickness of the electronic information recording element.

<8> The reversible thermosensitive recording medium according to any one of <3> and <5> above, wherein a thickness A of the second sheet, a maximum thickness B of the electronic information recording sheet, excluding a thickness of the electronic information recording element, and a thickness C of the third sheet satisfy the relation $0.00 \leq$ an absolute value of $(A-B)/C \leq 0.15$.

<9> The reversible thermosensitive recording medium according to any one of <1> to <8> above, further including an adhesive layer disposed between the first sheet and the second sheet housing in the cut-out portion the entire electronic information recording sheet, wherein a difference obtained by subtracting a height of the electronic information recording element from a total thickness of the first sheet and the adhesive layer is 0 μm to 25 μm.

<10> The reversible thermosensitive recording medium according to any one of <3>, <5>, <8> and <9> above, wherein the first, second and third sheets are formed of polyethylene terephthalate.

<11> The reversible thermosensitive recording medium according to any one of <3>, <5>, <8>, <9> and <10> above, wherein the third sheet has the same surface area as the base sheet and as the reversible thermosensitive recording sheet.

<12> The reversible thermosensitive recording medium according to any one of <1> to <11> above, wherein the reversible thermosensitive recording layer contains a leuco dye and at least one selected from compounds represented by the following General Formulas (1) and (2):

General Formula (1)

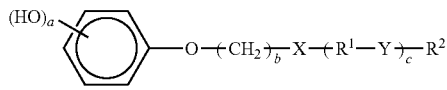

where X and Y each represent a hetero atom-containing divalent organic group, $R^1$ represents a substituted or unsubstituted divalent hydrocarbon group, $R^2$ represents a substituted or unsubstituted monovalent hydrocarbon group, a is an integer of 1 to 3, b is an integer of 1 to 20, and c is an integer of 0 to 3, General Formula (2)

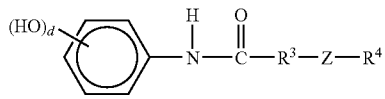

where Z represents a hetero atom-containing divalent organic group, $R^3$ represents a substituted or unsubstituted divalent hydrocarbon group, $R^4$ represents a substituted or unsubstituted monovalent hydrocarbon group, and d is an integer of 1 to 3.

In the reversible thermosensitive recording medium of the present invention, the second sheet housing in its cut-out portion the entire electronic information recording sheet is laid over the first sheet, and the electronic information recording element projecting from the electronic information recording sheet is inserted into the through hole of the first sheet. With this configuration, formation of convexo-concave portions (height differences) caused by the electronic information recording sheet can be reduced to smooth the surfaces of the reversible thermosensitive recording medium, which can avoid uneven contact between the top surface and a thermal head or an erase bar and between the bottom surface and a platen roller. As a result, even when image erasure/formation is performed at a high speed of 3 IPS or higher, white voids and color fading do not occur in the formed image areas each corresponding to the surrounding area of the electronic information recording sheet, to the electronic information recording element, to the antenna circuit and to the conductive member; image erasure can be completely performed; and no lamination displacement occurs.

The present invention can provide a high-quality electronic information recording element-embedded reversible thermosensitive recording medium in which, even when image erasure/formation is performed at a high speed of 3 IPS or higher, white voids and color fading do not occur in the formed image areas each corresponding to the surrounding area of the electronic information recording sheet, to the electronic information recording element, to the antenna circuit and to the conductive member; image erasure can be completely performed; and no lamination displacement occurs. This reversible thermosensitive recording medium can solve the problems pertinent in the art.

DETAILED DESCRIPTION OF THE INVENTION

Figure 1:
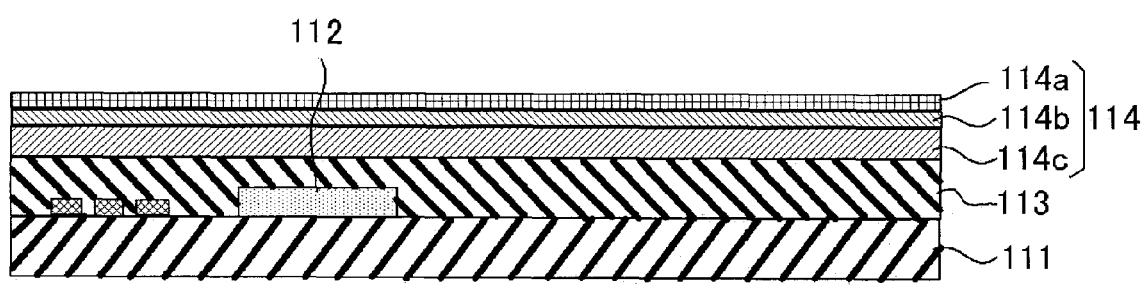
FIG. 1 is a cross-sectional view of a conventional reversible thermosensitive recording medium.

A reversible thermosensitive recording medium of the present invention includes an electronic information recording sheet having at least an electronic information recording element, a first sheet having a through hole into which the electronic information recording element can be inserted, and a second sheet having a cut-out portion capable of housing the entire electronic information recording sheet; and, if necessary, further includes a base sheet, a reversible thermosensitive recording sheet, a third sheet and other members.

In the present invention, the second sheet housing in the cut-out portion the entire electronic information recording sheet is laid over the first sheet, and the electronic information recording element projecting from the electronic information recording sheet is inserted into the through hole of the first sheet. With this configuration, formation of convexo-concave portions (height differences) caused by the electronic information recording sheet can be reduced to smooth the surfaces of the reversible thermosensitive recording medium, which can avoid uneven contact between the top surface and a thermal head or an erase bar and between the bottom surface and a platen roller. As a result, even when image erasure/formation is performed at a high speed of 3 IPS or higher, white voids and color fading do not occur in the formed image areas each corresponding to the surrounding area of the electronic information recording sheet, to the electronic information recording element, to the antenna circuit and to the conductive member; image erasure can be completely performed; and no lamination displacement occurs.

A reversible thermosensitive recording medium according to a first embodiment of the present invention includes a base sheet, an electronic information recording sheet having an electronic information recording element projecting toward the base sheet, a first sheet having a through hole, a second sheet and a reversible thermosensitive recording sheet, wherein the second sheet houses the entire electronic information recording sheet, and the first sheet, the second sheet and the reversible thermosensitive recording sheet are laid over the base sheet in this order, and wherein the electronic information recording element is inserted into the through hole.

A reversible thermosensitive recording medium according to a second embodiment of the present invention includes a reversible thermosensitive recording sheet, an electronic information recording sheet having an electronic information recording element projecting toward the reversible thermosensitive recording sheet, a first sheet having a through hole, a second sheet and a base sheet, wherein the second sheet houses the entire electronic information recording sheet, and the first sheet, the second sheet and the base sheet are laid over the reversible thermosensitive recording sheet in this order, and wherein the electronic information recording element is inserted into the through hole.

Preferably, a third sheet is disposed between the second sheet and the reversible thermosensitive recording sheet. In this layer structure, the electronic information recording sheet can be vertically sandwiched between the third sheet and the first sheet. As a result, formation of convexo-concave portions (height differences) caused by the electronic information recording sheet can be prevented to smooth both surfaces of the second sheet, reducing the occurrence of image voids.

Preferably, a gap between a periphery of the electronic information recording sheet and a periphery of the cut-out portion formed in the second sheet is 0.0 mm to 0.1 mm. When the gap falls within this range, the occurrence of image voids can be reduced. Notably, a state obtained when the gap is 0 mm refers to that where the entire electronic information recording sheet is just housed in the cut-out portion of the second sheet.

When it is greater than 0.1 mm, the gap is undesirably too large. In this case, even when the third sheet is formed over the second sheet, thermal conduction does not occur due to the heat insulating effect of air. As a result, the reversible thermosensitive recording medium cannot be rapidly cooled, potentially leading to failure in color development.

Preferably, the thickness of the second sheet falls within a range of ±10 μm of the maximum thickness of the electronic information recording sheet, excluding the thickness of the electronic information recording element. More preferably, it falls within a range of ±8 μm of the maximum thickness thereof. When the thickness of the second sheet falls within the above range, the occurrence of image voids can be reduced.

When the thickness of the second sheet is too larger or smaller than the maximum thickness of the electronic information recording sheet, excluding the thickness of the electronic information recording element, the third sheet cannot absorb concavo-convex portions (height differences) caused by the electronic information recording sheet. As a result, a thermal head unevenly comes into contact with the surface of the reversible thermosensitive recording medium, potentially leading to failure in color development.

Preferably, a thickness A of the second sheet, a maximum thickness B of the electronic information recording sheet, excluding the thickness of the electronic information recording element, and a thickness C of the third sheet satisfy the relation $0.00 \leq (A-B)/C \leq 0.15$. When the $(A-B)/C$ falls within this range, the occurrence of image voids can reduced.

When the ratio $(A-B)/C$ is in excess of 0.15, the third sheet cannot absorb concavo-convex portions (height differences) caused by the electronic information recording sheet since the thickness of third sheet is too small. As a result, a thermal head unevenly comes into contact with the surface of the reversible thermosensitive recording medium, potentially leading to failure in color development.

Preferably, an adhesive layer is disposed between the first sheet and the second sheet housing in the cut-out portion the entire electronic information recording sheet, and a difference obtained by subtracting a height of the electronic information recording element from a total thickness of the first sheet and the adhesive layer is 0 μm to 25 μm. More preferably, it is 0 μm to 20 μm. When the difference falls within the above range, the occurrence of image voids can be reduced.

When the difference is less than 0 μm, the electronic information recording element projects toward the base sheet, potentially leading to failure in color development in a formed image area corresponding to the surrounding area of the electronic information recording element. Whereas when the difference is in excess of 25 μm, a convex portion is formed on a base sheet side, potentially leading to failure in color development in a formed image area corresponding to the surrounding area of the electronic information recording element.

Notably, the height of the electronic information recording element (chip height) refers to a thickness (height) from the surface of an antenna circuit board to the top surface of the electronic information recording element. The chip height is determined as follows.

Figure 9:
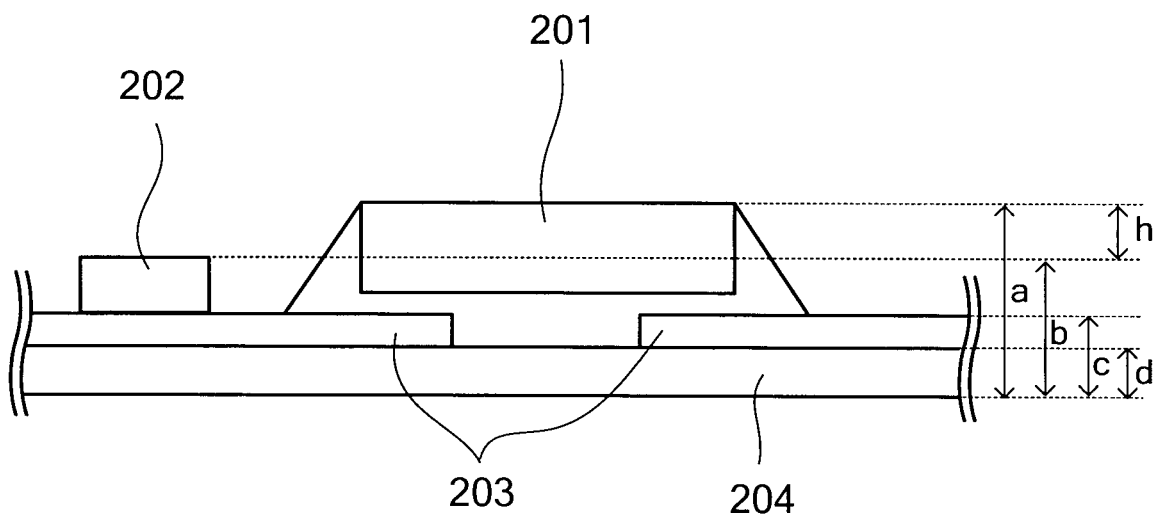
FIG. 9 is a side view of an electronic information recording sheet, which is used for defining the height of an electronic information recording element.

Specifically, as shown in FIG. 9, when an electronic information recording sheet has a caulking portion 202 and a chip portion 201 on an antenna portion 203 formed on a base 204, the chip height (h) is calculated by subtracting the thickness of the caulking portion (b) from the thickness of the chip portion (a).

Figure 10:
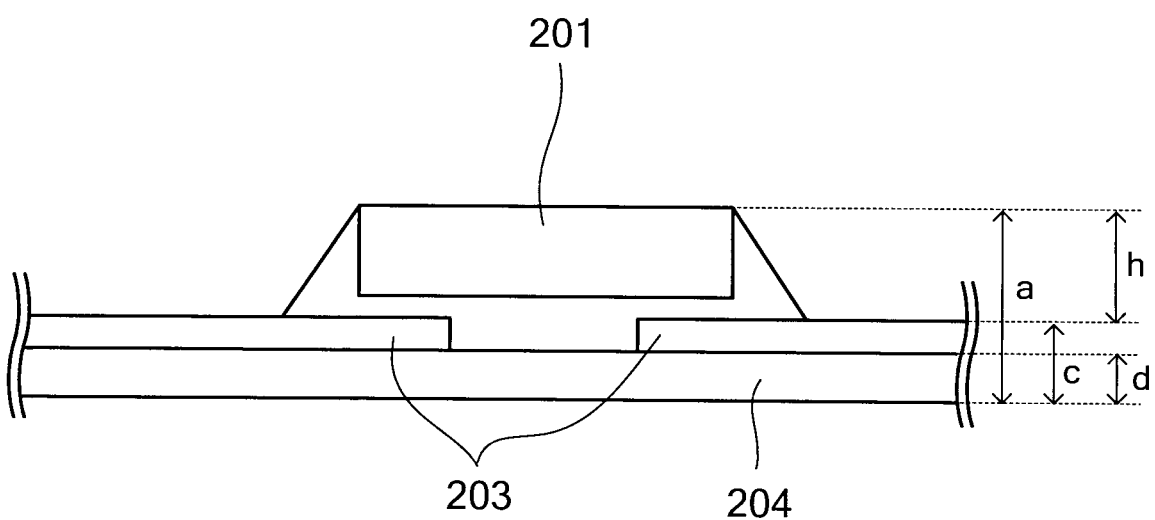
FIG. 10 is a side view of another electronic information recording sheet, which is used for defining the height of an electronic information recording element.

Meanwhile, as shown in FIG. 10, an electronic information recording sheet has no caulking portion on an antenna portion, the chip height (h) is calculated by subtracting the thickness of the antenna portion (c) from the thickness of the chip portion (a).

Note that HF inlays have a caulking portion, and in contrast, UHF inlays have no caulking portion.

The thickness of the first sheet is preferably 50 μm to 150 μm, more preferably 75 μm to 125 μm.

The thickness of the second sheet is preferably 25 μm to 200 μm, more preferably 50 μm to 188 μm.

The thickness of the third sheet is preferably 25 μm to 200 μm, more preferably 38 μm to 188 μm.

Figure 2:
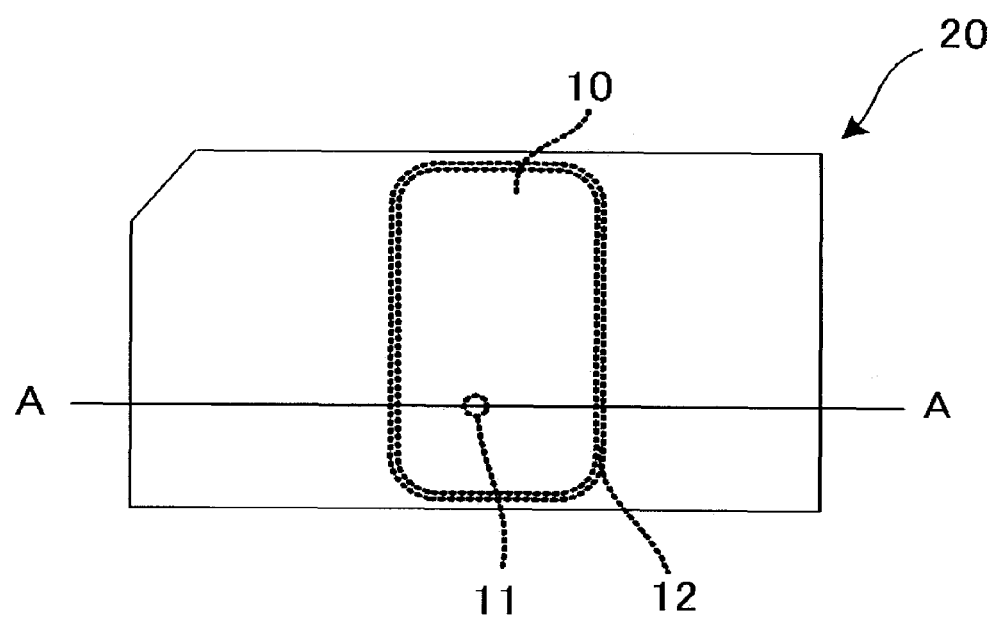
FIG. 2 is a plan view of an embodiment of a reversible thermosensitive recording medium of the present invention.

With reference to the drawings, next will be described in detail an electronic information recording element-embedded reversible thermosensitive recording medium of the present invention. FIG. 2 is a plan view of an embodiment of the reversible thermosensitive recording medium of the present invention, and FIGS. 3 and 4 are a cross-sectional view of the reversible thermosensitive recording medium shown in FIG. 2, as taken along an A-A line.

Figure 3:
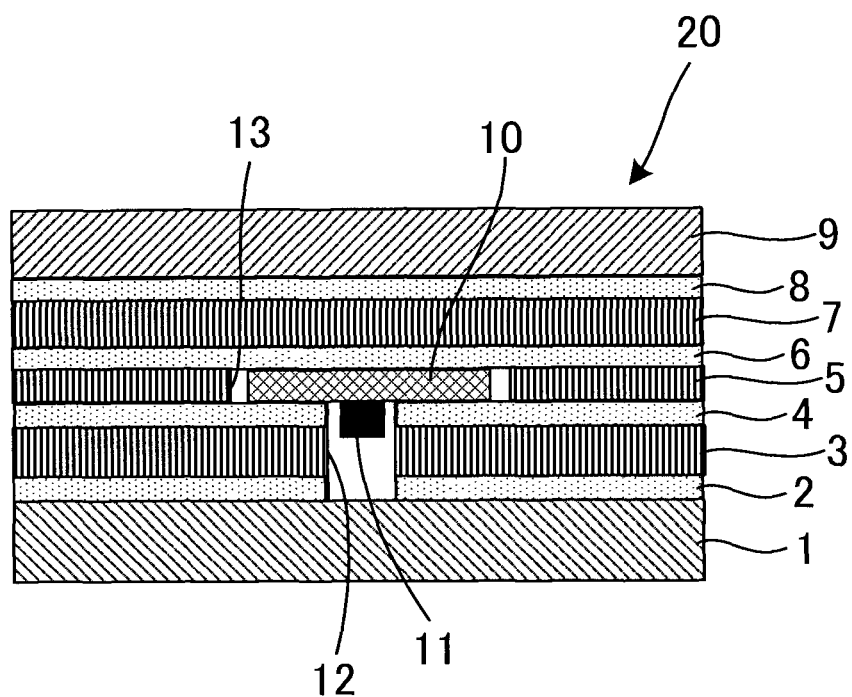
FIG. 3 is a schematic cross-sectional view of a first embodiment of the reversible thermosensitive recording medium.

As shown in FIG. 3, the electronic information recording element-embedded reversible thermosensitive recording medium 20 according to a first embodiment includes a base sheet 1; a first sheet 3 having a through hole 12 into which an electronic information recording element can be inserted; an electronic information recording sheet 10 having at least an electronic information recording element 11; a second sheet 5 having a cut-out portion 13 capable of housing an electronic information member; a third sheet 7; and a reversible thermosensitive recording sheet 9 having at least a reversible thermosensitive recording layer; these sheets being sequentially laminated. In FIG. 3, each of reference numerals 2, 4, 6 and 8 refers to an adhesive layer.

In the reversible thermosensitive recording medium 20, the first sheet is provided thereover with the second sheet housing in its cut-out portion the entire electronic information recording sheet, and the electronic information recording element of the electronic information recording sheet, which element projects toward the base sheet, is inserted into the through hole of the first sheet; and the base sheet 1; the first sheet 3; the second sheet 5 housing in its cut-out portion the entire electronic information recording sheet; the third sheet 7; and the reversible thermosensitive recording sheet 9 are sequentially laminated.

Figure 4:
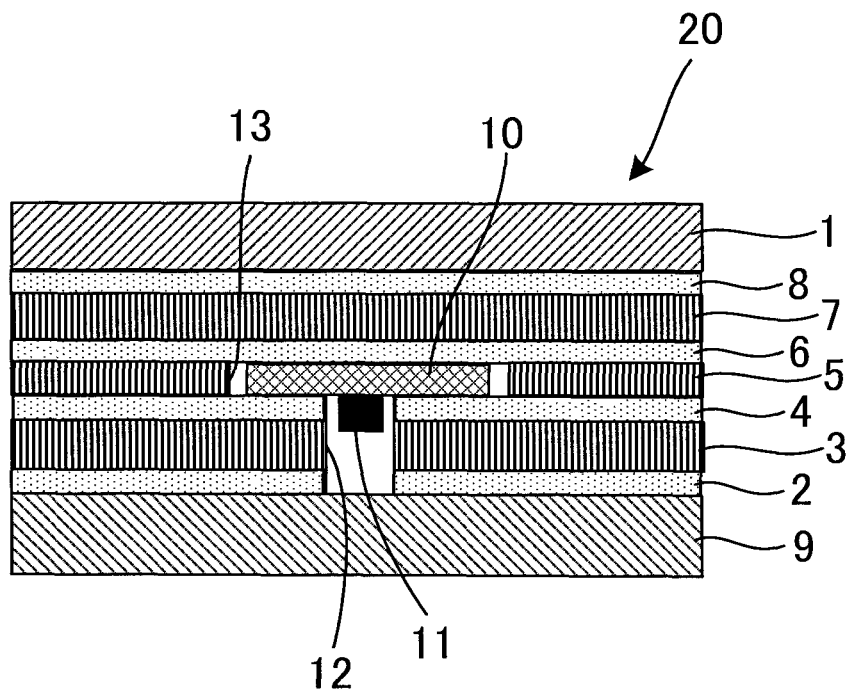
FIG. 4 is a schematic cross-sectional view of a second embodiment of the reversible thermosensitive recording medium.

As shown in FIG. 4, the electronic information recording element-embedded reversible thermosensitive recording medium 20 according to a second embodiment includes a reversible thermosensitive recording sheet 9 having at least a reversible thermosensitive recording layer; a first sheet 3 having a through hole 12 into which an electronic information recording element can be inserted; an electronic information recording sheet 10 having at least an electronic information recording element 11; a second sheet 5 having a cut-out portion 13 capable of housing an electronic information member; a third sheet 7; and a base sheet 1; these sheets being sequentially laminated. In FIG. 4, each of reference numerals 2, 4, 6 and 8 refers to an adhesive layer.

In the reversible thermosensitive recording medium 20, the first sheet is provided thereover with the second sheet housing in its cut-out portion the entire electronic information recording sheet, and the electronic information recording element of the electronic information recording sheet, which element projects toward the reversible thermosensitive recording sheet and is inserted into the through hole of the first sheet; and the reversible thermosensitive recording sheet 9; the first sheet 3; the second sheet 5 housing in its cut-out portion the entire electronic information recording sheet; the third sheet 7; and the base sheet 1 are laminated in this order.

<Base Sheet>

The shape, structure and size of the base sheet 1 are not particularly limited and can be appropriately determined depending on the intended purpose. The base sheet has a shape of film, sheet, etc. whose planar view is quadrangle, circular, etc. Also, the base sheet may have a single-layer structure, multi-layer structure, etc.

The base sheet 1 may be, for example, a resin sheet, a rubber sheet, a synthetic paper, a metal sheet, a glass sheet or a composite thereof. Particularly preferably, it is a resin sheet.

Examples of the resin sheet include polyethylene terephthalate sheets, polycarbonate sheets, polystyrene sheets and polymethyl methacrylate sheets. These may be used alone or in combination. Among them, polyethylene terephthalate sheets are particularly preferred.

Alternatively, the base sheet 1 may be appropriately synthesized or may be a commercially available product.

The thickness of the base sheet is not particularly limited and can be appropriately determined depending on the purpose. It is preferably 20 µm to 200 µm, more preferably 50 µm to 188 µm.

<Electronic Information Recording Sheet>

The electronic information recording sheet (hereinafter may be referred to as an "inlet") includes an electronic information recording element (IC chip) and an antenna circuit; and, if necessary, further includes a caulking portion, an antenna circuit board and other members.

Figure 5A:
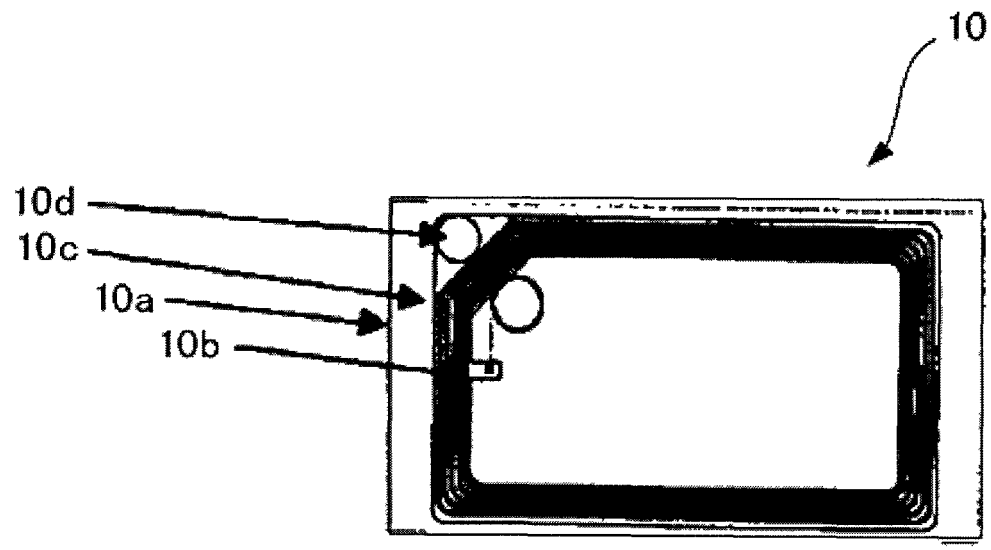
FIG. 5A is a plan view of an electronic information recording sheet used in the present invention.
Figure 5B:
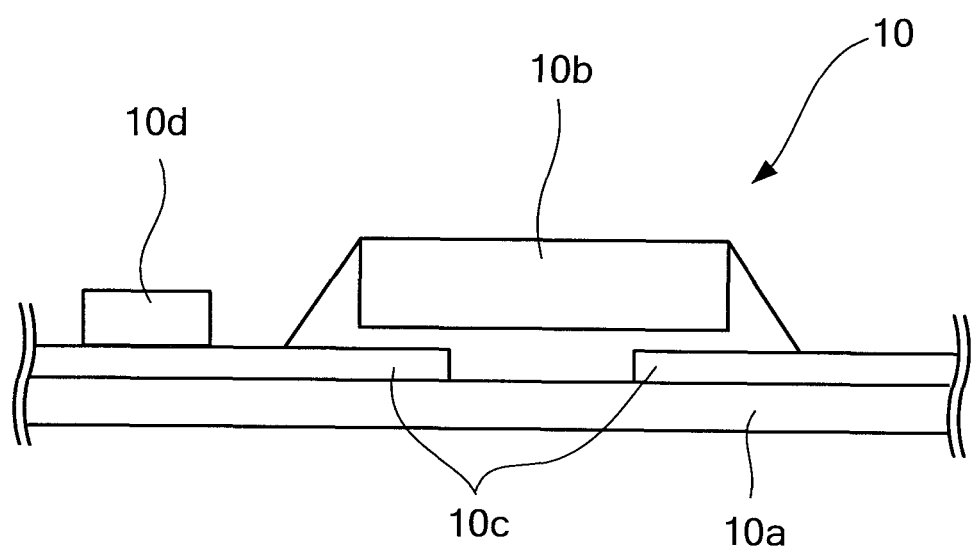
FIG. 5B is a side view of an electronic information recording sheet used in the present invention.

FIGS. 5A (plan view) and 5B (left-hand side view) show an electronic information recording sheet used in the present invention.

The electronic information recording sheet 10 has an antenna circuit board 10a (e.g., plastic film) and a coiled antenna circuit 10c formed thereon. This coiled antenna circuit forms an LC resonance circuit together with a capacity element, and can receive an electric wave having a predetermined frequency and send information stored in an electronic information recording element 10b to a source of the electric wave. In general, the communication frequency used may be appropriately selected from 125 kHz, 13.56 MHz, 2.45 GHz, 5.8 GHz (microwave) and the UHF band. Reference numeral 10d denotes a caulking portion.

The method for forming the antenna circuit 10c is not particularly limited. Examples thereof include a method by etching a metal film laminated on the antenna circuit board 10a; a method by winding a coated electrical wire (e.g., enamel wire) on the antenna circuit board 10a; and a method by printing conductive paste on the antenna circuit board 10a. Alternatively, the antenna circuit 10c may be formed so as to be embedded in an antenna circuit board.

The base material for forming the antenna circuit board 10a is not particularly limited and can be appropriately determined depending on the purpose. Examples thereof include rigid-type materials such as paper phenol, glass epoxy and composites; flexible-type materials such as polyimides, polyesters, polypropylenes, polyethylenes, polystyrenes, nylon, polyethylene terephthalate (PET), paper and synthetic paper; and complex-type materials of the rigid-type materials and the flexible-type materials.

The thickness of the base material is preferably 15 µm to 360 µm. It is more preferably 20 µm to 100 µm from the viewpoints of, for example, strength, operability and cost.

Examples of the metal film (foil) laminated include a copper film and an iron film. Of these, from the viewpoints of cost and operability, an aluminum film is preferred and the thickness is preferably 6 µm to 50 µm. The shape thereof is not particularly limited and may be square, rectangular, circular, ellipsoidal, etc.

The thickness (height) of the electronic information recording element 10b is preferably 200 µm or less, more preferably 25 µm to 140 µm. Also, a protective film (e.g., polyimide film, polyester film or paper) may be allowed to adhere to the electronic information recording element 10b for protection. The thickness of the protective film is preferably 10 µm to 60 µm.

Such an electronic information recording sheet 10 is not particularly limited and can be appropriately determined depending on the purpose. Examples thereof include inlets available from, for example, UPM, Co., OMRON, Co., Alien Technology, Co., SONY, Co., Fujitsu, Co., Hitachi, Ltd. and Texas Instruments Incorporated.

<First, Second and Third Sheets>

The first, second and third sheets may be, for example, a resin sheet, a rubber sheet, a synthetic paper, a metal sheet, a glass sheet or a composite thereof. Particularly preferably, it is a resin sheet.

The resin sheet is not particularly limited and can be appropriately determined depending on the purpose. Examples thereof include polyethylene terephthalate (PET) sheets, polycarbonate sheets, polystyrene sheets and polymethyl methacrylate sheets. Among them, PET sheets are particularly preferred from the viewpoint of attaining high rigidity. Specifically, the first, second and third sheets made of polyethylene terephthalate (PET) compensate, by virtue of their rigidity, concavo-convex portions attributed to the electronic information recording sheet, height differences between the electronic information recording sheet and the second sheet, the difference in thickness between the first sheet and the height of the electronic information recording element, etc., resulting in that the occurrence of image voids can be reduced.

As described above, the first sheet has a through hole into which an electronic information recording element can be inserted. The size of the through hole may be appropriately determined in consideration of that of the electronic information recording element.

The third sheet preferably has the same surface area as the base sheet and as the reversible thermosensitive recording sheet, from the viewpoints of avoiding formation of white voids, forming an image without color fading, and preventing sheets from being peeled off from edges.

<Reversible Thermosensitive Recording Sheet>

The reversible thermosensitive recording sheet 9 includes at least a reversible thermosensitive recording layer; and, if necessary, further includes an intermediate layer, a protective layer, a back layer, a base sheet and other layers.

Figure 6:
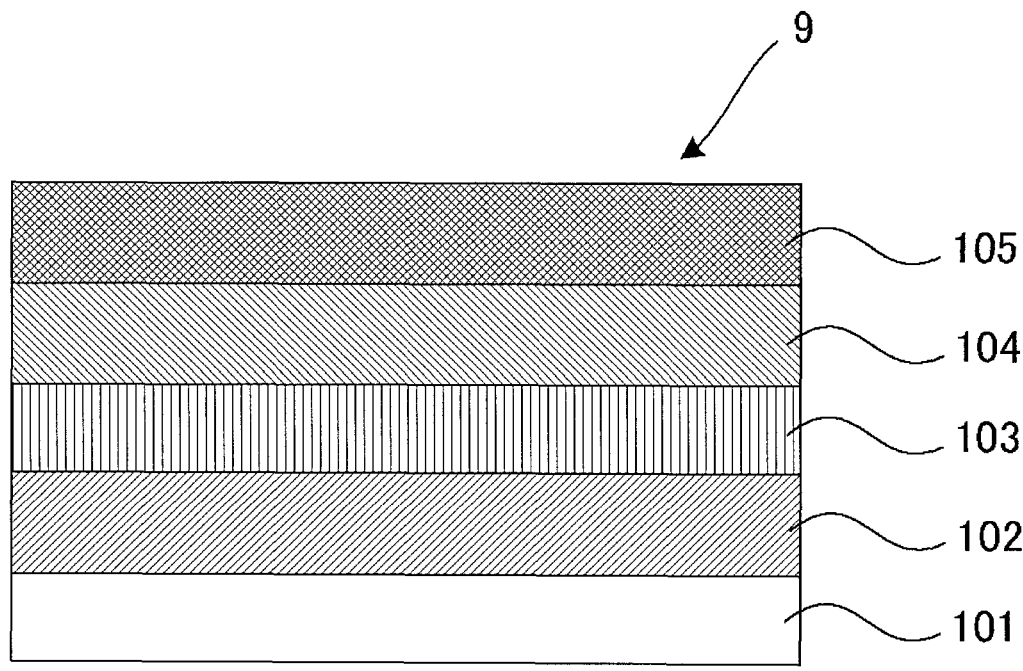
FIG. 6 is a cross-sectional view of a reversible thermosensitive recording sheet.

FIG. 6 shows an embodiment of the reversible thermosensitive recording sheet 9 used in the present invention. This reversible thermosensitive recording sheet has such a configuration that a reversible thermosensitive recording layer 103, an intermediate layer 104 and a protective layer 105 are laminated on one surface of a base sheet 102, and a back layer 101 is formed on the other surface of the base sheet.

The reversible thermosensitive recording layer 103 reversibly changes in color tone and contains a reversible thermosensitive recording material reversibly changing in color depending on change in temperature. The reversible thermosensitive recording material changes in color as a result of changing in, for example, light transmittance, light reflectance, light absorption wavelength and light scattering degree.

The reversible thermosensitive recording material is not particularly limited, so long as it can reversibly change in transparency or color toner by the action of heat, and can be appropriately determined depending on the purpose. Examples of the reversible thermosensitive recording material include those which turn into a first color at a first temperature higher than ambient temperature and turn into a second color after heating at a second temperature higher than the first temperature and then cooling.

Specific examples include a material which becomes transparent at a first temperature and becomes opaque at a second temperature (see JP-A No. 55-154198), a material which develops color at a second temperature and becomes colorless at a first temperature (see JP-A Nos. 04-224996, 04-247985 and 04-267190), a material which becomes opaque at a first temperature and becomes transparent at a second temperature (see JP-A No. 03-169590), and a material which turns into black, red, blue, etc. at a first temperature and becomes colorless at a second temperature (see JP-A Nos. 02-188293 and 02-188294). Particularly preferred are dispersions of an organic low-molecular-weight compound (e.g., higher fatty acids) in a base resin; and mixtures of a leuco dye and a color developer.

The leuco dye is not particularly limited and can be appropriately determined depending on the purpose. Examples of the leuco dye include phthalide compounds, azaphthalide compounds and fluoran compounds. These may be used alone or in combination.

The color developer is not particularly limited and can be appropriately determined depending on the purpose. Examples of the color developer include those disclosed in, for example, JP-A Nos. 05-124360, 06-210954 and 10-95175. These may be used alone or in combination.

The color developer is a compound having, in the molecule thereof, at least one structure allowing a leuco dye to develop color (e.g., a phenolic hydroxyl group, carboxylic acid group and phosphoric acid group) and at least one structure controlling an intermolecular force (e.g., a structure containing a long chain hydrocarbon group). These structures may be linked to each other via a di- or more-valent linking group containing a hetero atom. Also, the long chain hydrocarbon group may have such a linking group and/or an aromatic group.

Examples of such a color developer include those disclosed in, for example, JP-A Nos. 09-290563 and 11-188969. Among them, preferred are compounds represented by the following General Formulas (1) and (2). These color developers have much higher sensitivity than conventional color developers and thus, energy applied for image formation can be reduced by about 10% to about 30%. In this case, thermal decomposition of the color developer can be reduced, and less damage is given to the reversible thermosensitive recording medium and the surface thereof. As a result, durability after repetitive use does not degrade, maintaining excellent image quality.

General Formula (1)

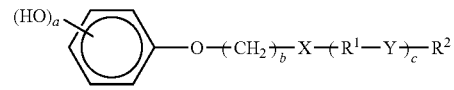

In General Formula (1), X and Y each represent a hetero atom-containing divalent organic group, $R^1$ represents a substituted or unsubstituted divalent hydrocarbon group, $R^2$ represents a substituted or unsubstituted monovalent hydrocarbon group, a is an integer of 1 to 3, b is an integer of 1 to 20, and c is an integer of 0 to 3.

General Formula (2)

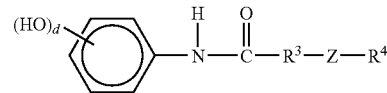

In General Formula (2), Z represents a hetero atom-containing divalent organic group, $R^3$ represents a substituted or unsubstituted divalent hydrocarbon group, $R^4$ represents a substituted or unsubstituted monovalent hydrocarbon group, and d is an integer of 1 to 3.

In General Formulas (1) and (2), as described above, each of X, Y and Z represents a hetero atom-containing divalent organic group, and particularly preferably represents a nitrogen or oxygen atom-containing divalent organic group; e.g., divalent organic groups containing at least one selected from the groups having the following structural formulas.

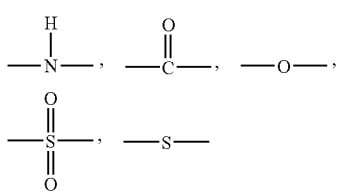

Preferred examples of the hetero atom-containing divalent organic group include those having the following structural formulas.

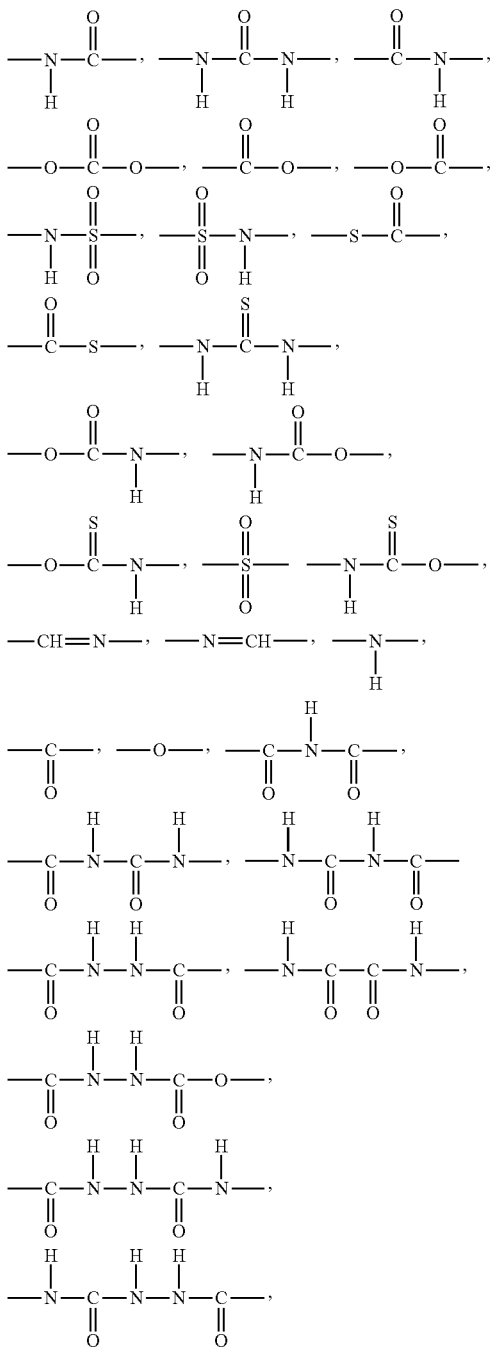

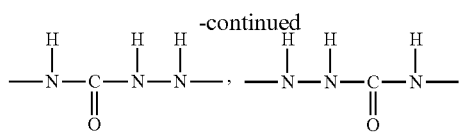

Of these, particularly preferred are those having the following structural formulas.

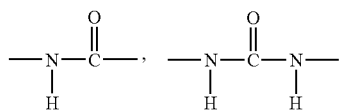

In General Formulas (1) and (2), each of $R^1$ and $R^3$ represents a substituted or unsubstituted divalent hydrocarbon group having 1 to 20 carbon atoms.

Preferred groups represented by $R^1$ or $R^3$ are those represented by the following structural formulas:

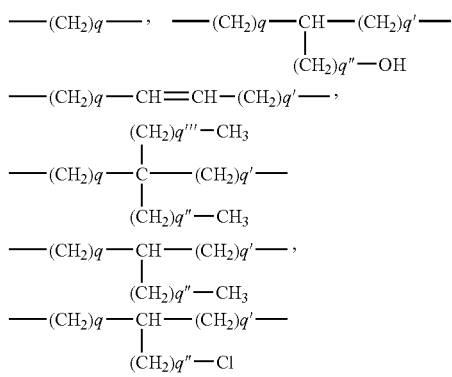

where each of q, q', q" and q''' is an integer satisfying the conditions: the total number of carbon atoms contained in the groups represented by $R^1$ or $R^3$ is 1 to 20. Among them, groups represented by $-(CH_2)_q-$ are particularly preferred.

In General Formulas (1) and (2), each of $R^2$ and $R^4$ represents a substituted or unsubstituted aliphatic hydrocarbon group having 1 to 24 carbon atoms, preferably 8 to 18 carbon atoms.

The aliphatic hydrocarbon group may be linear or branched, and may have an unsaturated bond. Examples of the substituent the hydrocarbon group may have include a hydroxyl group, halogen atoms and alkoxy groups. When the total number of carbon atoms contained in groups $R^1$ and $R^2$ or groups $R^3$ and $R^4$ is 7 or less, stable color development or color erasure deteriorates. Thus, the total number is preferably 8 or more, more preferably 11 or more.

Preferred groups represented by $R^2$ or $R^4$ are those represented by the following structural formulas:

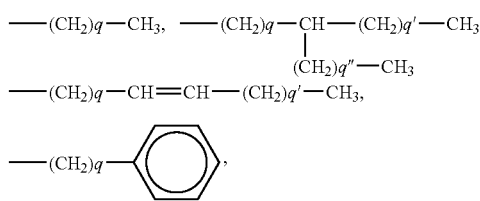

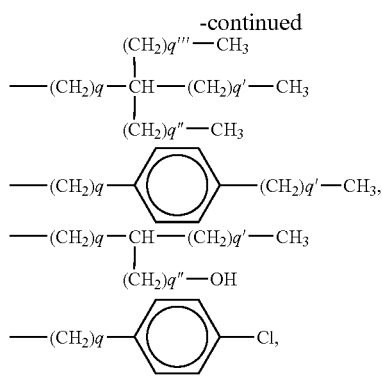

where each of q, q', q" and q'" is an integer satisfying the conditions: the total number of carbon atoms contained in the groups represented by $R^2$ or $R^4$ is 1 to 24. Among them, groups represented by —$(CH_2)_q$—$CH_3$ are particularly preferred.

If necessary, the reversible thermosensitive recording layer 103 may contain an additive for improving and/or controlling coating property of a coating liquid therefor and color developability/erasability thereof. Examples of the additive include surfactants, conductivity-imparting agents, fillers, antioxidants, color development stabilizers and color erasure promoter.

The reversible thermosensitive recording layer 103 preferably contains a leuco dye, a color developer and an additive together with a binder resin. The binder resin is not particularly limited, so long as it can bond the leuco dye, the color developer and the additive on the base sheet. Preferred examples of the binder resin include resins curable using heat, ultraviolet (UV) ray, electron beam (EB) for improving durability after repetitive use. Particularly preferred are thermally-curable resins using a curing agent. These resins can increase a gel ratio of the reversible thermosensitive recording layer 103.

The thermally-curable resin is not particularly limited and can be appropriately determined depending on the purpose. Examples of the thermally-curable resin include acryl polyol resins, polyester polyol resins, polyurethane polyol resins, polyvinyl butyral resins, cellulose acetate propionate and cellulose acetate butyrate.

The curing agent is not particularly limited and can be appropriately selected depending on the purpose. Preferably, isocyanates are used. Examples of the isocyanate include hexamethylene diisocyanate (HDI), tolylene diisocyanate (TDI), xylylene diisocyanate (XDI) and isophorone diisocyanate (IPDI); an adduct type, burette type, isocyanurate type formed between trimethylolpropane, etc. and the above isocyanates; and blocked products of the above isocyanates. Among them, preferred are hexamethylene diisocyanate, an adduct type thereof, a burette type thereof and an isocyanurate type thereof. Note that all the curing agent used do not participate in curing reaction. In other words, the reversible thermosensitive recording layer 103 may contain an unreacted curing agent. Also, curing catalysts may be used for allowing curing reaction to successfully proceed.

The reversible thermosensitive recording layer 103 preferably has a gel ratio of 30% or higher, more preferably 50% or higher, still more preferably 70% or higher. When the gel ratio is lower than 30%, the reversible thermosensitive recording layer may exhibit degraded durability after repetitive use.

Here, the gel ratio can be measured by immersing a coated film in a solvent having a high dissolution capability. Specifically, a reversible thermosensitive recording layer 103 is peeled off from a base sheet 102, followed by weighing (initial mass); and the thus-obtained reversible thermosensitive recording layer 103 is sandwiched between 400-mesh wire gauzes and then immersed in a solvent capable of dissolving an unreacted binder resin for 24 hours, followed by drying in vacuum and weighing (mass after drying). From the obtained values, the gel ratio can be calculated using the following Equation 1:

Gel ratio (%)=(mass after drying)/(initial mass)×100  <Equation 1>

Notably, the mass of other components than the binder resin (e.g., particles of organic low-molecular-weight compounds), which are contained in the reversible thermosensitive recording layer 103, is not taken into account for calculation. When the mass of particles of organic low-molecular-weight compounds is not previously obtained, it may be calculated from a mass ratio of the binder resin to the particles of organic low-molecular-weight compounds. The mass ratio can be determined based on their specific gravities and a ratio of an area occupied with the binder resin to that occupied with the particles of organic low-molecular-weight compounds by observing a unit area of the cross section of the layer through transmission electron microscopy (TEM), scanning electron microscopy (SEM), etc.

In the reversible thermosensitive recording layer 103, a mass ratio of the binder to a color developer is preferably 0.1 to 10. When the mass ratio is less than 0.1, the formed reversible thermosensitive recording layer 103 has insufficient heat resistance; whereas when the mass ratio is more than 10, the density of color developed may decrease.

The reversible thermosensitive recording layer 103 can be formed through application of a coating liquid prepared by homogeneously dispersing, in a solvent, a leuco dye, a color developer, an additive and a binder resin.

Examples of the solvent include alcohols, ketones, ethers, glycol ethers, esters, aromatic hydrocarbons and aliphatic hydrocarbons.

The coating liquid can be prepared using a disperser such as a paint shaker, a ball mill, an attriter, a three-roll mill, a Kady mill, a sand mill, a Dino mill or a colloid mill. Here, the coating liquid may be prepared by dispersing the above components in a solvent using a disperser or may be mixing dispersions of the above components one another. Also, these components are dissolved in a solvent under heating and then the solution is rapidly or slowly cooled for precipitation.

Examples of coating methods for forming the reversible thermosensitive recording layer include blade coating, wire bar coating, spray coating, air knife coating, bead coating, curtain coating, gravure coating, kiss coating, reverse roll coating, dip coating or die coating.

The thickness of the reversible thermosensitive recording layer 103 is not particularly limited and can be appropriately determined depending on the purpose. It is preferably 1 μm to 20 μm, more preferably 3 μm to 15 μm. When the thickness is less than 1 μm, the density of color developed may decrease to degrade the contrast of the formed image. Whereas when the thickness is more than 20 μm, position-dependent variation in the amount of heat applied becomes large in the reversible thermosensitive recording layer 103. Some portions of the recording layer do not develop color since the temperature of the portions does not reach a color developing temperature, potentially resulting in failure to attain a target color density.

—Protective Layer—

The protective layer 105 may contain a resin cured using heat, a UV ray, electron beam, etc. Particularly preferred are resins cured using a UV ray or an electron beam.

Examples of resins curable using a UV ray (electron beam) include urethane acrylate oligomers, epoxy acrylate oligomers, polyester acrylate oligomers, polyether acrylate oligomers, vinyl oligomers and unsaturated polyester oligomers; and monofunctional or polyfunctional monomers such as acrylates, methacrylates, vinyl esters, ethylene derivatives and allyl compounds.

Notably, when a UV ray is used for crosslinking, a photopolymerization initiator and a photopolymerization accelerator are preferably used. Meanwhile, examples of the thermally-curable resin include those exemplified above in relation to formation of the reversible thermosensitive recording layer. Also, these resins can be cured as described in relation to formation of the reversible thermosensitive recording layer.

The thickness of the protective layer 105 is preferably 0.1 µm to 10 µm.

—Intermediate Layer—

The intermediate layer 104 is provided for the purposes of improving adhesiveness between the reversible thermosensitive recording layer 103 and the protective layer 105, of preventing degradation of the reversible thermosensitive recording layer 103 during application of a coating liquid for the protective layer 105, and of preventing an additive contained in the protective layer 105 from infiltrating into the reversible thermosensitive recording layer 103. Provision of the intermediate layer can improve image stability.

The intermediate layer 104 may contain a thermoplastic resin and/or a resin cured using heat, a UV ray, electron beam, etc. Examples of the thermoplastic resin include polyethylenes, polypropylenes, polystyrenes, polyvinyl alcohols, polyvinyl butyrals, polyurethanes, saturated polyesters, unsaturated polyesters, epoxy resins, phenol resins, polycarbonates and polyamides. Meanwhile, examples of the resin curable using heat, a UV ray, electron beam, etc. include those exemplified above in relation to formation of the reversible thermosensitive recording layer. Also, these resins can be cured as described in relation to formation of the reversible thermosensitive recording layer. Notably, the intermediate layer 104 can be formed similar to formation of the reversible thermosensitive recording layer 103.

If necessary, the intermediate layer 104 may contain a filler, a UV ray absorber, etc. The filler content of the intermediate layer 104 is preferably 1% by volume to 95% by volume, more preferably 5% by volume to 75% by volume. Meanwhile, the amount of the UV ray absorber contained in the intermediate layer 104 is preferably 0.5% by mass to 10% by mass with respect to the resin.

The thickness of the intermediate layer 104 is preferably 0.1 µm to 20 µm, more preferably 0.3 µm to 3 µm.

Also, the intermediate layer 104 and/or protective layer 105, which are to be laminated over the reversible thermosensitive recording layer 103, preferably contain a resin having low air permeability, from the viewpoint of preventing oxidization of a leuco dye and a color developer contained in the reversible thermosensitive recording layer 103.

Also, an under layer may be provided between the reversible thermosensitive recording layer 103 and the base sheet 102. Provision of the under layer can improve sensitivity of color development of the reversible thermosensitive recording layer 103 and adhesiveness between the reversible thermosensitive recording layer 103 and the base sheet 102.

Also, in order for the reversible thermosensitive recording layer 103 to develop color through application of a laser light, a light-heat converting layer, which converts light to heat upon absorbing a laser light, may be provided on the reversible thermosensitive recording sheet 9.

Furthermore, a heat insulating layer (e.g., air layer) may be provided on the reversible thermosensitive recording sheet 9 to prevent heat release.

—Back Layer—

The back layer 101 is provided on a surface of the base sheet 102 on which surface the reversible thermosensitive recording layer 103 is not provided, for the purpose of preventing the other surface of the base sheet 102 from curing, which is caused by shrinkage of the resin.

The back layer 101 may contain a resin cured using, for example, heat, a UV ray and electron beam (preferably, a UV ray). Examples of the resin curable using heat, UV ray, electron beam, etc. include those exemplified above in relation to formation of the reversible thermosensitive recording layer. Also, these resins can be cured as described in relation to formation of the reversible thermosensitive recording layer.

Notably, the back layer 101 can be formed similar to formation of the reversible thermosensitive recording layer 103. Preferably, a coating liquid for the back layer 101 is applied onto the base sheet so that the formed back layer can successfully compensate shrinkage of a surface of the base sheet on which surface the reversible thermosensitive recording layer 103 is provided. Through this treatment, a reversible thermosensitive recording sheet, which is obtained after all the layers have been formed, can be smoothed.

In addition to the resin, the back layer 101 may contain an organic filler, an inorganic filler, a lubricant, a color pigment, an antistatic agent, a UV ray absorber, etc.

Examples of the inorganic filler include carbonates, silicates, metal oxides and sulfuric acid compounds.

Examples of the organic filler include silicone resins, cellulose resins, epoxy resins, nylon resins, phenol resins, polyurethane resins, urea resins, melamine resins, polyesters, polycarbonates, styrene resins, acrylic resins, polyethylenes, formaldehyde resins and polymethyl methacrylates.

Examples of the UV ray absorber include compounds having a salicylate structure, a cyano acrylate structure, a benzotriazole structure or a benzophenon structure.

Examples of the lubricant include synthetic waxes, vegetable waxes, animal waxes, higher alcohols, higher fatty acids, esters of higher fatty acids, and amides.

The thickness of the back layer 101 is preferably 0.1 µm to 10 µm.

The reversible thermosensitive recording sheet 9 is not particularly limited and can be appropriately determined depending on the purpose. Examples of commercially available products employed as the reversible thermosensitive recording sheet include 630BF, 530BF, 630BD, 530BD, 430BD, 631FB, 431FB (these products are of Ricoh Company, Ltd.), TRCG99CS, TRCG99SS, TRCG99SH, TRCGAACS and TRCGBBBS (these products are of MITSUBISHI PAPER MILLS LIMITED.).

<Adhesive Layer>

An adhesive layer 2 is provided between the base sheet 1 and the first sheet 3; an adhesive layer 4 is provided between the first sheet 3 and the second sheet 5 housing in its cut-out portion the entire electronic information recording sheet 10; an adhesive layer 6 is provided between the second sheet 5 and the third sheet 7; and an adhesive layer 8 is provide between the third sheet 7 and the reversible thermosensitive recording sheet 9.

The adhesive layers 2, 4, 6 and 8 may be made of an adhesive agent.

The adhesive agent is not particularly limited, so long as it can allow one sheet to adhere to another sheet through pressure application at ambient temperature, and can be appropriately determined depending on the purpose. Examples of the adhesive agent include urea resins, melamine resins, phenol resins, epoxy resins, vinyl acetate resins, vinyl acetate-acrylic copolymers, ethylene-vinyl acetate copolymers, acrylic resins, polyvinyl ether resins, vinyl chloride-vinyl acetate copolymers, polystyrene resins, polyester resins, polyurethane resins, polyamide resins, chlorinated polyolefin resins, polyvinyl butyral resins, acrylic acid ester copolymers, methacrylic acid ester copolymers, natural rubbers, synthetic rubbers, cyanoacrylate resins, silicone resins, styrene-isoprene-styrene block copolymers and EVA resins.

Among them, preferred are natural rubbers, synthetic rubbers, acrylic resins, silicone resins, polyurethane resins, styrene-isoprene-styrene block copolymers and EVA resins, with acrylic resins being particularly preferred.

The type of the adhesive agent used and the thickness of the adhesive layer can be appropriately determined in consideration of the type of a target, the surrounding environment, required adhesive strength, etc. Also, the adhesive layer may contain, for example, various additives, an inorganic filler, an organic filler and a fibrous material.

The thickness of each of the adhesive layers 2, 4, 6 and 8 is preferably 10 μm to 150 μm, more preferably 10 μm to 130 μm, still more preferably 10 μm to 100 μm.

When the thickness is less than 10 μm, sufficient adhesive strength cannot be obtained, resulting in easy delamination of the layers. Whereas when the thickness is more than 150 μm, the adhesive layer may be melt and outflow through thermal pressure applied from a heating tool (e.g., a thermal head) during printing and erasing of the reversible thermosensitive recording medium.

Next will be exemplarily described a method for producing the reversible thermosensitive recording medium of the present invention.

Firstly, an adhesive layer-containing first sheet is treated by a through hole forming unit so as to have a through hole having such a size that an IC chip of an adhesive layer-containing electronic information recording sheet can be housed. Separately, an adhesive layer-containing second sheet is treated by a cut-out portion forming unit so as to have such a cut-out portion that the entire electronic information recording sheet can be housed. Subsequently, after an adhesive layer-containing third sheet and an adhesive layer-containing base sheet have been fed, a reversible thermosensitive recording sheet, the third sheet, the second sheet housing in its cut-out portion the entire electronic information recording sheet, the first sheet having the through hole, and the base sheet are sequentially laminated via adhesive layers using a roller so that the IC chip is not broken. These five sheets are fed so that the IC chip of the electronic information recording sheet is housed in the through hole of the second sheet. The five sheets are bonded to one another and cut into a piece having an optimal size, to thereby produce a reversible thermosensitive recording medium of the present invention.

In order to form an image, the reversible thermosensitive recording medium of the present invention is heated to a temperature higher than a color developing temperature and then rapidly cooled. Specifically, when heated for a short time using a thermal head or a laser light, the reversible thermosensitive recording layer is locally increased in temperature. This reversible thermosensitive recording layer immediately undergoes thermal diffusion (i.e., rapid cooling) to develop color. Meanwhile, in order to erase an image, the reversible thermosensitive recording layer is heated using a heat source for a long time and then cooled, or is heated to a temperature slightly lower than a color developing temperature. When heated for a long time, the reversible thermosensitive recording layer is increased in temperature in a wide range thereof. Thus, it takes a long time for the recording medium to be cooled, and the recording medium is in a color erased state. The heat source used may be a heating roller, a heating stamp, a heating blow, etc. During image erasure, applied energy may be decreased to a level slightly lower than the level at which energy has been applied for image formation by controlling a voltage applied to a thermal head and the pulse width. In this method, use of only a thermal head can perform both image formation and image erasure; i.e., can perform so-called overwriting.

Figure 7:
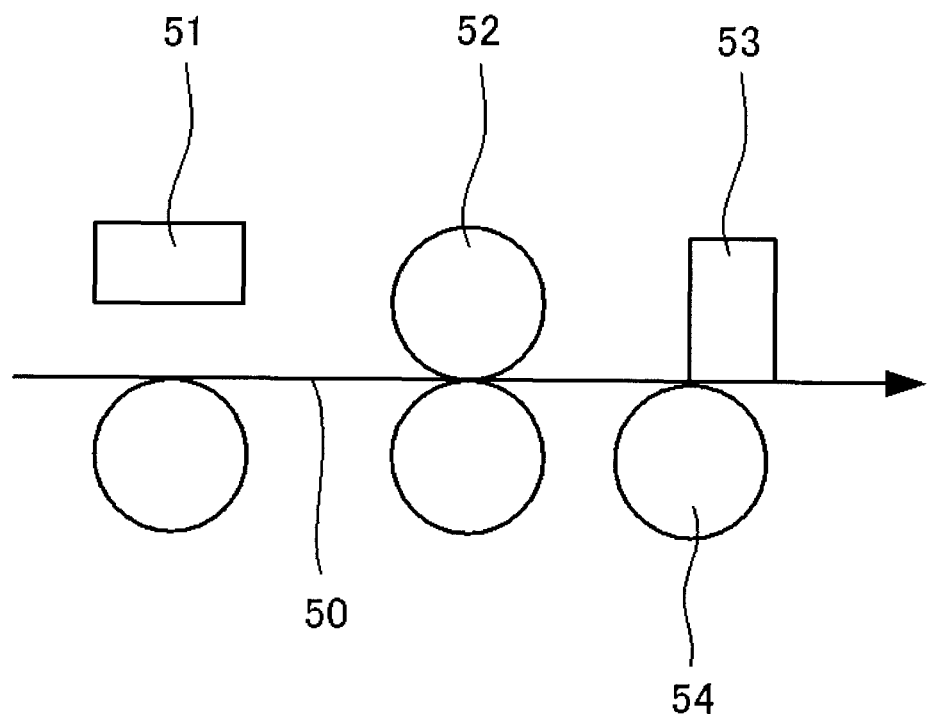
FIG. 7 schematically illustrates a printer used in the present invention

FIG. 7 shows one exemplary printer for forming and erasing an image on the reversible thermosensitive recording medium of the present invention. In this printer, a reversible thermosensitive recording medium 50 is transferred in a direction indicated by an arrow and discharged through a ceramic bar 51, transfer rollers 52, a thermal head 53 and a platen roller 54 to the outside of the printer. The ceramic bar 51 erases an image, and the thermal head 53 and the platen roller 54 form an image.

Figure 8:
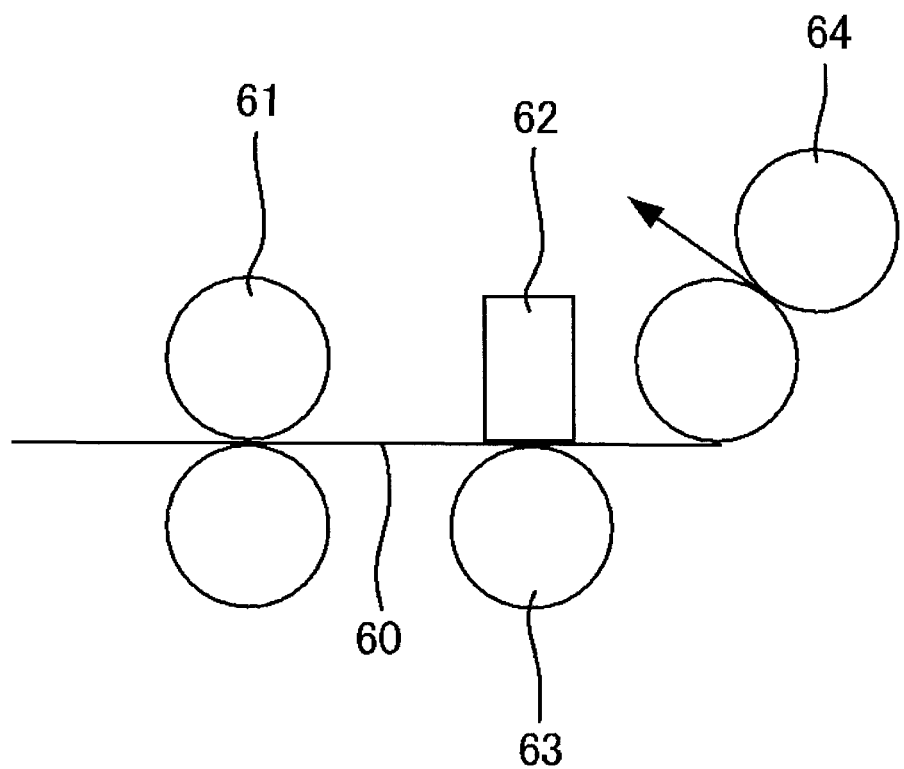
FIG. 8 schematically illustrates another printer used in the present invention

FIG. 8 shows another exemplary printer for forming and erasing an image on the reversible thermosensitive recording medium of the present invention. In this printer, a reversible thermosensitive recording medium 60 is transferred in a direction indicated by an arrow and discharged through a heat roller 61, a thermal head 62, a platen roller 63 and a transfer roller 64 to the outside of the printer. The heat roller 61 erases an image, and the thermal head 62 and the platen roller 63 form an image.

The transfer speed at which the reversible thermosensitive recording medium is transferred is not particularly limited and can be appropriately determined depending on the purpose. In the present invention, even when image erasure/formation is performed at a high speed of 3 IPS or higher, white voids and color fading do not occur in the formed image areas each corresponding to the surrounding area of the electronic information recording sheet, to the electronic information recording element, to the antenna circuit and to the conductive member; and image erasure can be completely performed.

The reversible thermosensitive recording medium and printer are configured so that an image is precisely formed and erased through heating. In particular, small sized printers are configured so that an image is precisely formed and erased by adjusting heating energy applied in a heating treatment, since image formation and image erasure are performed at shorter intervals.

The reversible thermosensitive recording medium of the present invention has both the reversible thermosensitive recording layer and the electronic information recording element (IC chip) and thus, information stored in the IC chip can be shown on the reversible thermosensitive recording layer, which, conveniently, enables the information to be recognized from the outside.

The electronic information recording element-embedded reversible thermosensitive recording medium of the present invention can be widely used, for example, as gateway tickets and as stickers for frozen food containers, industrial products, drug containers, etc. In addition, it is processed so as to have a size equivalent to that of a general document, and can be used, for example, in logistics, process management and document management.

EXAMPLES

The present invention will next be described by way of Examples, which should not be construed as limiting the present invention thereto.

Examples 1 to 9

Production of Reversible Thermosensitive Recording Medium

Through a commonly used method, reversible thermosensitive recording media of Examples 1 to 9 were produced using materials shown in Tables 1 to 4. Each of the reversible thermosensitive recording media had a layer structure shown in FIG. 3; i.e., a laminated structure sequentially including a base sheet 1 (J), an adhesive layer 2 (I), a first sheet 3 (H), an adhesive layer 4 (G), a second sheet 5 (E) housing in its cut-out portion the entire electronic information recording sheet 10 (F), an adhesive layer 6 (D), a third sheet 7 (C), an adhesive layer 8 (B) and a reversible thermosensitive recording sheet 9 (A).

Notably, the second sheet 5 (E) had a cut-out portion having such a size that the electronic information recording sheet can be housed, and the entire electronic information recording sheet 10 (F) is housed in the cut-out portion. Also, the first sheet 3 (H) has a through hole into which the electronic information recording element can be inserted. The third sheet 7 (C) has the same surface area as the base sheet. The base sheet has the same surface area as the reversible thermosensitive recording sheet.

Example 10

Production of Reversible Thermosensitive Recording Medium

Through a commonly used method, a reversible thermosensitive recording media of Example 10 was produced using materials shown in Table 5. The reversible thermosensitive recording media had a layer structure shown in FIG. 4; i.e., a laminated structure sequentially including a reversible thermosensitive recording sheet 9 (A), an adhesive layer 2 (I), a first sheet 3 (H), an adhesive layer 4 (G), a second sheet 5 (E) housing in its cut-out portion the entire electronic information recording sheet 10 (F), an adhesive layer 6 (D), a third sheet 7 (C), an adhesive layer 8 (B) and a base sheet 1 (J).

Notably, the second sheet 5 (E) had a cut-out portion having such a size that the electronic information recording sheet can be housed, and the entire electronic information recording sheet 10 (F) is housed in the cut-out portion. Also, the first sheet 3 (H) has a through hole into which the electronic information recording element can be inserted. The third sheet 7 (C) has the same surface area as the base sheet. The base sheet has the same surface area as the reversible thermosensitive recording sheet.

Comparative Example 1

Production of Reversible Thermosensitive Recording Medium

The procedure of Examples 1 to 9 was repeated, except that materials shown in Table 2 are used and that none of the adhesive layer 6 (D) and the second sheet 5 (E) was formed, to thereby produce a reversible thermosensitive recording medium of Comparative Example 1 having a layer structure shown in FIG. 3.

Comparative Example 2

Production of Reversible Thermosensitive Recording Medium

The procedure of Examples 1 to 9 was repeated, except that materials shown in Table 2 are used and that none of the adhesive layer 4 (G) and the first sheet 3 (H) was formed, to thereby produce a reversible thermosensitive recording medium of Comparative Example 2 having a layer structure shown in FIG. 3.

Comparative Example 3

Production of Reversible Thermosensitive Recording Medium

The procedure of Examples 1 to 9 was repeated, except that materials shown in Table 4 are used and that none of the third sheet 7 (C), the adhesive layer 6 (D) and the second sheet 5 (E) was formed, to thereby produce a reversible thermosensitive recording medium of Comparative Example 3 having a layer structure shown in FIG. 3.

TABLE 1

| | | Example 1 | | Example 2 | | Example 3 | |
|---|---|---|---|---|---|---|---|
| | Layer/Sheet | Material | Thickness | Material | Thickness | Material | Thickness |
| A | Reversible thermosensitive recording sheet | Ricoh Co. CR film 630BD | 170 μm | Ricoh Co. CR film 630BD | 170 μm | Ricoh Co. CR film 630BD | 170 μm |
| B | Adhesive layer | Tohoshiko Yellow Cepanon Support | 20 μm | DIC Corp. #8616 | 60 μm | DIC Corp. #8080 | 50 μm |
| C | Third sheet | TOYOBO Crisper K1212 | 75 μm | Toray Lumiller U34 | 75 μm | Toray Lumiller E20 | 50 μm |
| D | Adhesive layer | Tohoshiko Yellow Cepanon Support | 20 μm | DIC Corp. #8616 | 60 μm | DIC Corp. #8080 | 50 μm |
| E | Second sheet | TOYOBO Crisper K1212 | 100 μm | Toray Lumiller U34 | 188 μm | Toray Lumiller E20 | 50 μm |
| F | Electronic information recording sheet | UPM Co. Rafsec inlet | | DNP Co. 13.56 MHz inlet | | Hitachi, Ltd. μ-Chip Hibiki | |

TABLE 1-continued

|  | Layer/Sheet | Example 1 Material | Thickness | Example 2 Material | Thickness | Example 3 Material | Thickness |
|---|---|---|---|---|---|---|---|
|  | Chip portion (thickness) a |  | 230 μm |  | 320 μm |  | 160 μm |
|  | Caulking portion (thickness) b |  | 110 μm |  | 180 μm |  | — |
|  | Antenna portion (thickness) c |  | 73 μm |  | 162 μm |  | 49 μm |
|  | Base (thickness) d |  | 55 μm |  | 150 μm |  | 30 μm |
| G | Adhesive layer | Tohoshiko Yellow Cepanon Support | 20 μm | DIC Corp. #8616 | 60 μm | DIC Corp. #8080 | 50 μm |
| H | First layer | TOYOBO Crisper K1212 | 125 μm | Toray Lumiller U34 | 100 μm | Toray Lumiller E20 | 75 μm |
| I | Adhesive layer | Tohoshiko Yellow Cepanon Support | 20 μm | DIC Corp. #8616 | 60 μm | DIC Corp. #8080 | 50 μm |
| J | Base sheet | TOYOBO Crisper K1212 | 100 μm | Toray Lumiller U34 | 125 μm | Toray Lumiller E20 | 100 μm |
|  | Gap between E and F |  | 0.10 mm |  | 0.08 mm |  | 0.02 mm |
|  | Difference in thickness between E and F (excluding IC chip) |  | −10 μm (=100 − 110) |  | 8 μm (=188 − 180) |  | 1 μm (=50 − 49) |
|  | (E − F in thickness)/C (excluding IC chip) |  | −0.13(=(100 − 110)/75) |  | 0.11(=(188 − 180)/75) |  | 0.02(=(50 − 49)/50) |
|  | (G + H) − height of IC chip |  | 25 μm (=(20 + 125) − (230 − 110)) |  | 20 μm (=(60 + 100) − (320 − 180)) |  | 14 μm (=(50 + 75) − (160 − 49)) |
|  | Material of sheets |  | White PET |  | Transparent PET |  | White PET |

Note:
the thicknesses a, b, c and d correspond to those shown in FIGS. 9 and 10.

TABLE 2

|  | Layer/Sheet | Example 4 Material | Thickness | Comp. Ex. 1 Material | Thickness | Comp. Ex. 2 Material | Thickness |
|---|---|---|---|---|---|---|---|
| A | Reversible thermosensitive recording sheet | Ricoh Co. CR film 630BD | 170 μm | Ricoh Co. CR film 630BD | 170 μm | Ricoh Co. CR film 630BD | 170 μm |
| B | Adhesive layer | Not provided |  | DIC Corp. #8616 | 60 μm | DIC Corp. #8080 | 50 μm |
| C | Third sheet |  |  | Toray Lumiller U34 | 75 μm | Toray Lumiller E20 | 50 μm |
| D | Adhesive layer | Tohoshiko Yellow Cepanon Support | 20 μm | Not provided |  | DIC Corp. #8080 | 50 μm |
| E | Second sheet | TOYOBO Crisper K1212 | 100 μm |  |  | Toray Lumiller E20 | 50 μm |
| F | Electronic information recording sheet | UPM Co. Rafsec inlet |  | DNP Co. 13.56 MHz inlet |  | Hitachi, Ltd. μ-Chip Hibiki |  |
|  | Chip portion (thickness) a |  | 230 μm |  | 320 μm |  | 160 μm |
|  | Caulking portion (thickness) b |  | 110 μm |  | 180 μm |  | — |
|  | Antenna portion (thickness) c |  | 73 μm |  | 162 μm |  | 49 μm |
|  | Base (thickness) d |  | 55 μm |  | 150 μm |  | 30 μm |
| G | Adhesive layer | Tohoshiko Yellow Cepanon Support | 20 μm | DIC Corp. #8616 | 60 μm | Not provided |  |
| H | First layer | TOYOBO Crisper K1212 | 125 μm | Toray Lumiller U34 | 100 μm |  |  |

TABLE 2-continued

| | | Example 4 | | Comp. Ex. 1 | | Comp. Ex. 2 | |
|---|---|---|---|---|---|---|---|
| Layer/Sheet | | Material | Thickness | Material | Thickness | Material | Thickness |
| I | Adhesive layer | Tohoshiko Yellow Cepanon Support | 20 μm | DIC Corp. #8616 | 60 μm | DIC Corp. #8080 | 50 μm |
| J | Base sheet | TOYOBO Crisper K1212 | 100 μm | Toray Lumiller U34 | 125 μm | Toray Lumiller E20 | 100 μm |
| | Gap between E and F | 0.10 mm | | — | | 0.02 mm | |
| | Difference in thickness between E and F (excluding IC chip) | −10 μm (=100 − 110) | | −180 μm (=0 − 180) | | 1 μm (=50 − 49) | |
| | (E − F in thickness)/C (excluding IC chip) | — | | −2.4(=(0 − 180)/75) | | 0.02(=(50 − 49)/50) | |
| | (G + H) − height of IC chip | 25 μm (=(20 + 125) − (230 − 110)) | | 20 μm (=(60 + 100) − (320 − 180)) | | −111 μm (=(0 + 0) − (160 − 49)) | |
| | Material of sheets | White PET | | Transparent PET | | White PET | |

Note:
the thicknesses a, b, c and d correspond to those shown in FIGS. 9 and 10.

TABLE 3

| | | Example 5 | | Example 6 | | Example 7 | |
|---|---|---|---|---|---|---|---|
| Layer/Sheet | | Material | Thickness | Material | Thickness | Material | Thickness |
| A | Reversible thermosensitive recording sheet | Ricoh Co. CR film 630BD | 170 μm | Ricoh Co. CR film 630BD | 170 μm | Ricoh Co. CR film 630BD | 170 μm |
| B | Adhesive layer | Tohoshiko Yellow Cepanon Support | 20 μm | DIC Corp. #8080 | 50 μm | DIC Corp. #8616 | 60 μm |
| C | Third sheet | TOYOBO Crisper K1212 | 100 μm | Toray Lumiller E20 | 100 μm | Toray Lumiller U34 | 38 μm |
| D | Adhesive layer | Tohoshiko Yellow Cepanon Support | 20 μm | DIC Corp. #8080 | 50 μm | DIC Corp. #8616 | 60 μm |
| E | Second sheet | TOYOBO Crisper K1212 | 125 μm | Toray Lumiller T60 | 25 μm | Toray Lumiller U34 | 188 μm |
| F | Electronic information recording sheet | UPM Co. Rafsec inlet | | Hitachi, Ltd. μ-Chip Hibiki | | DNP Co. 13.56 MHz inlet | |
| | Chip portion (thickness) a | 230 μm | | 160 μm | | 320 μm | |
| | Caulking portion (thickness) b | 110 μm | | — | | 180 μm | |
| | Antenna portion (thickness) c | 73 μm | | 49 μm | | 162 μm | |
| | Base (thickness) d | 55 μm | | 30 μm | | 150 μm | |
| G | Adhesive layer | Tohoshiko Yellow Cepanon Support | 20 μm | DIC Corp. #8080 | 50 μm | DIC Corp. #8616 | 60 μm |
| H | First layer | TOYOBO Crisper K1212 | 125 μm | Toray Lumiller E20 | 75 μm | Toray Lumiller U34 | 100 μm |
| I | Adhesive layer | Tohoshiko Yellow Cepanon Support | 20 μm | DIC Corp. #8080 | 50 μm | DIC Corp. #8616 | 60 μm |
| J | Base sheet | TOYOBO Crisper K1212 | 100 μm | Toray Lumiller E20 | 100 μm | Toray Lumiller U34 | 125 μm |
| | Gap between E and F | 0.1 mm | | 0.02 mm | | 0.08 mm | |
| | Difference in thickness between E and F (excluding IC chip) | 15 μm (=125 − 110) | | −24 μm (=25 − 49) | | 8 μm (=188 − 180) | |

TABLE 3-continued

| Layer/Sheet | Example 5 Material | Thickness | Example 6 Material | Thickness | Example 7 Material | Thickness |
|---|---|---|---|---|---|---|
| (E − F in thickness)/C (excluding IC chip) | 0.15(=(125 − 110)/100) | | −0.24(=(25 − 49)/100) | | 0.21(=(188 − 180)/38) | |
| (G + H) − height of IC chip | 25 μm (=(20 + 125) − (230 − 110)) | | 14 μm (=(50 + 75) − (160 − 49)) | | 20 μm (=(60 + 100) − (320 − 180)) | |
| Material of sheets | White PET | | White PET | | Transparent PET | |

Note:
the thicknesses a, b, c and d correspond to those shown in FIGS. 9 and 10.

TABLE 4

| | | Example 8 | | Example 9 | | Comp. Ex. 3 | |
|---|---|---|---|---|---|---|---|
| | Layer/Sheet | Material | Thickness | Material | Thickness | Material | Thickness |
| A | Reversible thermosensitive recording sheet | Ricoh Co. CR film 630BD | 170 μm | Ricoh Co. CR film 630BD | 170 μm | Ricoh Co. CR film 630BD | 170 μm |
| B | Adhesive layer | DIC Corp. #8080 | 50 μm | DIC Corp. #8080 | 50 μm | Hot melt Sumitomo 3M 3792LM | 100 μm |
| C | Third sheet | Toray Lumiller E20 | 50 μm | Toray Lumiller E20 | 50 μm | Not provided | |
| D | Adhesive layer | DIC #8080 | 50 μm | DIC #8080 | 50 μm | Not provided | |
| E | Second sheet | Toray Lumiller E20 | 50 μm | Toray Lumiller E20 | 50 μm | | |
| F | Electronic information recording sheet | Hitachi, Ltd. μ-Chip Hibiki | | Hitachi, Ltd. μ-Chip Hibiki | | UPM Co. Rafsec inlet | |
| | Chip portion (thickness) a | | 160 μm | | 160 μm | | 230 μm |
| | Caulking portion (thickness) b | | — | | — | | 110 μm |
| | Antenna portion (thickness) c | | 49 μm | | 49 μm | | 73 μm |
| | Base (thickness) d | | 30 μm | | 30 μm | | 55 μm |
| G | Adhesive layer | DIC Corp. #8080 | 50 μm | DIC Corp. #8080 | 50 μm | Hot melt Sumitomo 3M 3792LM | 100 μm |
| H | First layer | Toray Lumiller E20 | 75 μm | Toray Lumiller E20 | 50 μm | TOYOBO Crisper K1212 | 125 μm |
| I | Adhesive layer | DIC Corp. #8080 | 50 μm | DIC Corp. #8080 | 50 μm | Tohoshiko Yellow Cepanon Support | 20 μm |
| J | Base Sheet | Toray Lumiller E20 | 100 μm | Toray Lumiller E20 | 100 μm | TOYOBO Crisper K1212 | 100 μm |
| | Gap between E and F | 0.2 mm | | 0.02 mm | | — | |
| | Difference in thickness between E and F (excluding IC chip) | 1 μm (=50 − 49) | | 1 μm (=50 − 49) | | −110 μm (=0 − 110) | |
| | (E − F in thickness)/C (excluding IC chip) | 0.02(=(50 − 49)/50) | | 0.02(=(50 − 49)/50) | | — | |
| | (G + H) − height of IC chip | 14 μm (=(50 + 75) − (160 − 49)) | | −11 μm (=(50 + 50) − (160 − 49)) | | 25 μm (=(20 + 125) − (230 − 110)) | |
| | Material of sheets | White PET | | White PET | | White PET | |

Note:
the thicknesses a, b, c and d correspond to those shown in FIGS. 9 and 10.

TABLE 5

|   | Layer/Sheet | Material | Thickness |
|---|---|---|---|
| J | Base sheet | TOYOBO Crisper K1212 | 100 μm |
| B | Adhesive layer | Tohoshiko Yellow Cepanon Support | 20 μm |
| C | Third sheet | TOYOBO Crisper K1212 | 75 μm |
| D | Adhesive layer | Tohoshiko Yellow Cepanon Support | 20 μm |
| E | Second sheet | TOYOBO Crisper K1212 | 100 μm |
| F | Electronic information recording sheet | UPM Co. Rafsec inlet | |
|   | Chip portion (thickness) a | | 230 μm |
|   | Caulking portion (thickness) b | | 110 μm |
|   | Antenna portion (thickness) c | | 73 μm |
|   | Base (thickness) d | | 55 μm |
| G | Adhesive layer | Tohoshiko Yellow Cepanon Support | 20 μm |
| H | First layer | TOYOBO Crisper K1212 | 125 μm |
| I | Adhesive layer | Tohoshiko Yellow Cepanon Support | 20 μm |
| A | Reversible thermosensitive recording sheet | Ricoh Co. CR film 630BD | 170 μm |
|   | Gap between E and F | | 0.10 mm |
|   | Difference in thickness - between E and F (excluding IC chip) | | −10 μm (=100 − 110) |
|   | (E − F in thickness)/C (excluding IC chip) | | −0.13 (=(100 − 110)/75) |
|   | (G + H) − height of IC chip | | 25 μm (=(20 + 125) − (230 − 110)) |
|   | Material of sheets | | White PET |

Note:
the thicknesses a, b, c and d correspond to those shown in FIGS. 9 and 10.

Next will be described in detail a reversible thermosensitive recording sheet A (CR film 630BD, product of Ricoh Company Ltd.) shown in Tables 1 to 5.

—Production of Thermosensitive Recording Layer—

The following components were pulverized and dispersed using a ball mill so as to have an average particle diameter of 0.1 μm to 1.0 μm.

2-Anilino-3-methyl-6-dibutylaminofluoran (leuco dye): 1 part by mass Electron-accepting compound having the following structural formula (color developer): 4 parts by mass

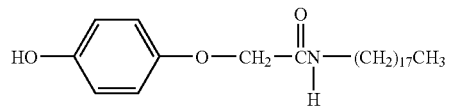

Dialkylurea (product of Nippon Kasei Chemical Co., Ltd., Hacreen SB): 1 part by mass
40% by mass acrylpolyol resin solution (product of Mitsubishi Rayon Co., Ltd., LR327): 10 parts by mass
Methyl ethyl ketone: 80 parts by mass Subsequently, isocyanate (4 parts by mass) (product of Nippon Polyurethane Industry Co., Ltd., Coronate HL) was added to the resultant dispersion, followed by thoroughly stirring, to thereby prepare a coating liquid for forming a thermosensitive recording layer. Thereafter, the resultant coating liquid was applied onto an opaque polyester film (E28G (thickness: 100 μm), product of TORAY INDUSTRIES INC.) using a wire bar, followed by heating at 100° C. for 2 min and then drying at 60° C. for 24 hours, to thereby form a thermosensitive recording layer having a thickness of 12 μm to 13 μm.

—Production of Protective Layer—

The following components were pulverized and dispersed using a ball mill so as to have an average particle diameter of 2 μm to 3 μm, to thereby produce a coating liquid for forming a protective layer.

Compound having the following Structural Formula (1) (KAYARAD DPHA (solid content: 100% by mass), product of Nippon Kayaku Co., Ltd.): 4 parts by mass
Compound having the following Structural Formula (2) (KAYARAD DPCA-60, product of Nippon Kayaku Co., Ltd.): 21 parts by mass
The amount of the compound having Structural Formula (1): the amount of the compound having Structural Formula (2)=1.6:8.4

Acrylate (A): 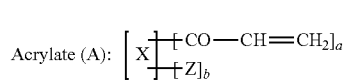 Structural Formula (1)

Acrylate (B): 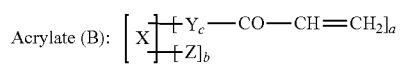 Structural Formula (2)

In Structural Formulas (1) and (2), X represents a pentaerythrithol group or a dipentaerythritol group, Y represents —CH$_2$O—, —CH$_2$CH$_2$O—, —CH$_2$CH$_2$CH$_2$O—, —CH$_2$CH$_2$CH$_2$CH$_2$O—, —CH$_2$CH$_2$CH$_2$CH$_2$CH$_2$O—, —CH$_2$CH(CH$_3$)O— or —CO—CH$_2$CH$_2$CH$_2$CH$_2$CH$_2$O—, and Z represents —H or —CO—CH=CH$_2$, a is 1 to 5, b is 1 to 5, and c is 1 to 12.
Silica (P-526, product of MIZUSAWA INDUSTRIAL CHEMICALS, LTD): 2 parts by mass
Photopolymerization initiator (Irgacure 184, product of Nihon Ciba-Geigy K.K.): 1 part by mass
Isopropyl alcohol: 60 parts by mass
Toluene: 10 parts by mass The resultant coating liquid was applied onto the thermosensitive recording layer using a wire bar, followed by drying under heating at 90° C. for 1 min. The thus-obtained product was irradiated with UV rays for crosslinking using an ultraviolet lamp at an irradiation energy of 80 W/cm to form a protective layer having a thickness of 3 μm, to thereby produce a reversible thermosensitive recording sheet A (CR film 630BD, product of Ricoh Company Ltd.).

Subsequently, each of the above-produced reversible thermosensitive recording media of Examples 1 to 10 and Comparative Examples 1 to 3 was evaluated for formation of white voids and the degree of lamination displacement as follows. The results are shown in Table 6.

<Evaluation for Formation of White Voids>

Using the RP-K8520HF-5A1 printer (product of SHINKO ELECTRIC CO., LTD.), a solid image was printed and erased on the reversible thermosensitive recording medium at a transfer speed of 3 IPS and an erasing temperature of 170° C. Subsequently, printed image areas were visually evaluated, each area corresponding to the IC chip, the antenna circuit, the conductive member, and the surrounding area of the inlet, according to the following evaluation criteria.

[Evaluation Criteria]

A: Excellent image obtained, without unprinted portions and image fading
B: Unprinted portions and image fading slightly observed
C: Unprinted portions and image fading considerably observed <Lamination Displacement>

After a solid image had been printed and erased on it 500 times using the above printer under the above conditions, the reversible thermosensitive recording medium was evaluated for lamination displacement between the base sheet (uppermost base sheet) of the reversible thermosensitive recording sheet A and the base sheet J (lowermost base sheet) using a JIS 1st class slide caliper.

TABLE 6

| | Examples | | | | | | | | | | Comp. Exs. | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| White voids by IC chip | A | A | A | A | A | A | A | A | B | A | C | C | C |
| White voids by inlet | A | A | A | B | B | B | B | B | A | A | C | C | C |
| White voids by antenna circuit and conductive member | A | A | A | B | A | A | A | A | A | A | C | C | C |
| Lamination displacement | 0 mm | 0 mm | 0 mm | 0 mm | 0 mm | 0 mm | 0 mm | 0 mm | 0 mm | 0 mm | 0 mm | 0 mm | 3 mm |

In the reversible thermosensitive recording medium of the present invention, even when image erasure/formation is performed at high speed, white voids and color fading do not occur in the formed image areas each corresponding to the surrounding area of the electronic information recording sheet, to the electronic information recording element, to the antenna circuit and to the conductive member; image erasure can be completely performed; and no lamination displacement occurs. Thus, the reversible thermosensitive recording medium can be widely used, for example, as gateway tickets and as stickers for frozen food containers, industrial products, drug containers, etc. In addition, it can be used for logistics, process management and other various applications.

What is claimed is:

1. A reversible thermosensitive recording medium comprising:
    an electronic information recording sheet having at least an electronic information recording element projecting from a surface thereof,
    a first sheet having a through hole into which the electronic information recording element can be inserted,
    a second sheet having a cut-out portion capable of housing the entire electronic information recording sheet,
    a reversible thermosensitive recording sheet and
    a base sheet,
    wherein the second sheet houses in the cut-out portion the entire electronic information recording sheet, with being laid over the first sheet, and the electronic information recording element is inserted into the through hole and
    wherein the first sheet, the second sheet housing the entire electronic information recording sheet, and the base sheet are laid over the reversible thermosensitive recording sheet in this order; and the electronic information recording element projects toward the reversible thermosensitive recording sheet and is inserted into the through hole.

2. The reversible thermosensitive recording medium according to claim 1, further comprising a third sheet disposed between the second sheet and the base sheet.

3. The reversible thermosensitive recording medium according to claim 2, wherein the first, second and third sheets are formed of polyethylene terephthalate.

4. The reversible thermosensitive recording medium according to claim 2, wherein the third sheet has the same surface area as the base sheet and as the reversible thermosensitive recording sheet.

5. The reversible thermosensitive recording medium according to claim 1, wherein a gap between a periphery of the electronic information recording sheet and a periphery of the cut-out portion is 0.0 mm to 0.1 mm.

6. The reversible thermosensitive recording medium according to claim 1, wherein a thickness of the second sheet falls within a range of ±10 μm of a maximum thickness of the electronic information recording sheet, excluding a thickness of the electronic information recording element.

7. The reversible thermosensitive recording medium according to claim 1, further comprising an adhesive layer disposed between the first sheet and the second sheet housing in the cut-out portion the entire electronic information recording sheet,
    wherein a difference obtained by subtracting a height of the electronic information recording element from a total thickness of the first sheet and the adhesive layer is 0 μm to 25 μm.

8. The reversible thermosensitive recording medium according to claim 1, wherein the reversible thermosensitive recording layer contains a leuco dye and at least one selected from compounds represented by the following General Formulas (1) and (2):

General Formula (1)

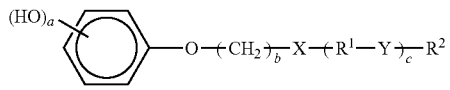

where X and Y each represent a hetero atom-containing divalent organic group, $R^1$ represents a substituted or unsubstituted divalent hydrocarbon group, $R^2$ represents a substituted or unsubstituted monovalent hydrocarbon group, a is an integer of 1 to 3, b is an integer of 1 to 20, and c is an integer of 0 to 3, General Formula (2)

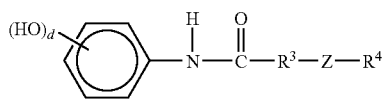

where Z represents a hetero atom-containing divalent organic group, $R^3$ represents a substituted or unsubstituted divalent hydrocarbon group, $R^4$ represents a substituted or unsubstituted monovalent hydrocarbon group, and d is an integer of 1 to 3.

* * * * *